US012571503B2

(12) United States Patent
Chae

(10) Patent No.: US 12,571,503 B2
(45) Date of Patent: Mar. 10, 2026

(54) METHOD FOR PERFORMING REAL-TIME RESPONSE HYDROGEN-CHARGING PROCESS, AND DEVICE THEREFOR

(71) Applicant: MIRAE EHS-CODE RESEARCH INSTITUTE, Seoul (KR)

(72) Inventor: Chung Keun Chae, Seoul (KR)

(73) Assignee: Mirae EHS-Code Research, Seoul (KR)

( * ) Notice: Subject to any disclaimer, the term of this patent is extended or adjusted under 35 U.S.C. 154(b) by 343 days.

(21) Appl. No.: 18/036,055

(22) PCT Filed: Nov. 12, 2021

(86) PCT No.: PCT/KR2021/016535

§ 371 (c)(1),
(2) Date: May 9, 2023

(87) PCT Pub. No.: WO2022/108256

PCT Pub. Date: May 27, 2022

(65) Prior Publication Data

US 2024/0027028 A1 Jan. 25, 2024

(30) Foreign Application Priority Data

Nov. 17, 2020 (KR) ........................ 10-2020-0153674
Dec. 15, 2020 (KR) ........................ 10-2020-0175539
(Continued)

(51) Int. Cl.
*F17C 13/02* (2006.01)
*F17C 5/06* (2006.01)
*F17C 7/00* (2006.01)

(52) U.S. Cl.
CPC ................ *F17C 13/02* (2013.01); *F17C 5/06* (2013.01); *F17C 7/00* (2013.01); *F17C 2221/012* (2013.01); *F17C 2223/0123* (2013.01)

(58) Field of Classification Search
CPC .... F17C 13/02; F17C 5/06; F17C 7/00; F17C 2221/012; F17C 2223/0123;
(Continued)

(56) References Cited

U.S. PATENT DOCUMENTS 9,279,541 B2 * 3/2016 Cohen .................. F17C 13/026
9,574,708 B2 * 2/2017 Ammouri ............ F17C 13/023
(Continued)

FOREIGN PATENT DOCUMENTS

JP 2011158010 A * 8/2011
WO WO-2011092560 A1 * 8/2011 ............... F17C 5/06
WO 2019235386 A1 12/2019

OTHER PUBLICATIONS

JP-2011158010-A English Translation of Specification (Year: 2025).*

*Primary Examiner* — Kenneth Rinehart
*Assistant Examiner* — Stephanie A Shrieves
(74) *Attorney, Agent, or Firm* — Fish IP Law, LLP

(57) ABSTRACT

A method for performing a real-time response hydrogen-charging process in a hydrogen-charger may comprise the steps of: calculating a pressure loss coefficient value in a charging line to be applied to a real case; calculating the inner diameter value of the charging line to be applied to the real case, on the basis of the calculated pressure loss coefficient value, a preset reference pressure loss coefficient value in a reference case, and a preset inner diameter value of a reference charging line in the reference case; and performing the hydrogen-charging process by applying the calculated inner diameter value of the charging line to a
(Continued)

predetermined thermodynamic model for real-time hydrogen-charging in the real case.

9 Claims, 7 Drawing Sheets

(30) Foreign Application Priority Data

Mar. 15, 2021 (KR) ........................ 10-2021-0033128
Nov. 8, 2021 (KR) ........................ 10-2021-0152613

(58) Field of Classification Search
CPC .............. F17C 2205/0142; F17C 5/007; F17C 2223/036; F17C 2225/0123; F17C 2225/036; F17C 2250/032; F17C 2250/034; F17C 2250/043; F17C 2250/0636; F17C 2250/0694; F17C 2260/023; F17C 2260/025; F17C 2265/065; F17C 2270/0139; Y02E 60/32
USPC .............................................................. 141/4
See application file for complete search history.

(56) References Cited

U.S. PATENT DOCUMENTS

| | | | | |
|---|---|---|---|---|
| 10,648,618 | B2 * | 5/2020 | Uchida | F17C 13/02 |
| 2012/0216915 | A1 * | 8/2012 | Takata | F28D 7/14 141/82 |
| 2012/0267002 | A1 * | 10/2012 | Kittilsen | F17C 13/02 141/4 |
| 2014/0216599 | A1 * | 8/2014 | Loewenthal | F17C 5/00 141/4 |
| 2014/0290790 | A1 * | 10/2014 | Mathison | F17C 5/007 141/94 |
| 2017/0059089 | A1 | 3/2017 | Uchida | |
| 2019/0074528 | A1 * | 3/2019 | Mori | B60K 15/07 |
| 2019/0184847 | A1 * | 6/2019 | Mathison | F17C 13/028 |
| 2020/0223684 | A1 * | 7/2020 | Natori | B67D 7/04 |
| 2021/0262618 | A1 * | 8/2021 | Handa | F17C 5/06 |

* cited by examiner

METHOD FOR PERFORMING REAL-TIME RESPONSE HYDROGEN-CHARGING PROCESS, AND DEVICE THEREFOR

TECHNICAL FIELD

The present invention relates to hydrogen fueling, and more particularly to a method and apparatus for executing a real-time responding hydrogen fueling process.

BACKGROUND ART

A hydrogen vehicle, which is a vehicle that uses hydrogen as a fuel for power, burns hydrogen in an internal combustion engine in order to drive an electric motor or react hydrogen and oxygen with each other in a fuel cell in order to convert chemical energy of hydrogen into dynamic energy. Hydrogen is used in order to supply a fuel for transportation. The hydrogen fuel has a higher danger than fossil fuels due to characteristics of rapid fueling at a high pressure, and complete fueling is not easy due to compression and heat generation according to the Joule-Thomson effect. In many countries, therefore, hydrogen fueling protocols have been developed, and much research on a hydrogen fueling protocol using a lookup table about a pressure ramp rate and a target pressure based on parameters during fueling, which is one of the developed hydrogen fueling protocols, has been conducted.

In a hydrogen fueling protocol (HFP) of the Society of Automotive Engineers (SAE) J2601 established in the year of 2010, a scheme of performing fueling using a large number of tables pre-prepared through simulation by a thermodynamic model and parameters and coefficients of calculation expressions is adopted. The HFP is designed on the assumption that two worst cases, such as a hot case and a cold case, are provided and all vehicles to which hydrogen fueling is to be performed exist in the two worst cases. As a result, in the HFP, many assumptions and categories are set, and many constraints are prescribed for an application range and an application method. The reason that the existing HFP is complicated is that the HFP is design on the premise that communication is impossible or inaccurate.

In recent years, however, hydrogen fuel cell vehicles have been increasingly popularized and large-sized mobilities (bus, truck, and vessel) for solving a global warming problem have been rapidly commercialized. In particular, the large-sized mobilities are different from each other in scale and use, and therefore it is structurally impossible to accommodate the capacity, fueling velocity, nominal working pressure, and application restrictions of a compressed hydrogen storage system (CHSS) based on the existing HFP. Consequently, it is necessary to introduce a new HFP. In particular, there is a need to introduce a new HFP capable of securing versatility of an application range and accommodating high capacity, high velocity, and high efficiency in an application method. There is a need for a new HFP capable of remarkably remedying limitation in the application range and the application method of the existing HFP and low efficiency thereof.

However, a new HFP capable of solving problems with the conventional HFP has not yet been proposed.

DISCLOSURE

Technical Problem

It is an object of the present invention to provide a method of executing a real-time responding hydrogen fueling process in a hydrogen dispenser.

It is another object of the present invention to provide a hydrogen dispenser for executing a real-time responding hydrogen fueling process.

It is another object of the present invention to provide a method of a compressed hydrogen storage system executing a real-time responding hydrogen fueling process.

It is a further object of the present invention to provide a compressed hydrogen storage system for executing a real-time responding hydrogen fueling process.

Objects of the present invention are not limited to the aforementioned objects, and other unmentioned objects will be clearly understood by those skilled in the art to which the present invention pertains based on the following description.

Technical Solution

A method of executing a real-time responding hydrogen fueling process by a hydrogen dispenser to achieve the object includes calculating a pressure loss coefficient value in a fueling line to be applied to a real case, calculating an inner diameter value of the fueling line to be applied in the real case based on the calculated pressure loss coefficient value, a predetermined reference pressure loss coefficient value for a reference case, and an inner diameter value of a predetermined reference fueling line for the reference case, and executing the hydrogen fueling process by applying the calculated inner diameter value of the fueling line to a predetermined thermodynamic model for real-time hydrogen fueling in the real case.

The method may include obtaining first information including information related to the real-time temperature of a hydrogen tank in a compressed hydrogen storage system, the real-time pressure of the hydrogen tank, and the real-time state of charge of the hydrogen tank and determining whether at least one of the obtained real-time temperature of the hydrogen tank, the obtained real-time pressure of the hydrogen tank, and the obtained real-time state of charge of the hydrogen tank is equal to or greater than a predetermined value.

The method may include checking whether the at least one is not equal to or greater than the predetermined value and a predetermined time has elapsed after starting of hydrogen fueling and determining whether the obtained real-time pressure of the hydrogen tank is less than a predetermined pressure if the predetermined time has elapsed.

The method may further include finishing the real-time responding hydrogen fueling process when the at least one is equal to or greater than the predetermined value.

At least one of the obtained real-time temperature of the hydrogen tank, the obtained real-time pressure of the hydrogen tank, and the obtained real-time state of charge of the hydrogen tank may be updated in a predetermined cycle.

The method may include obtaining second information related to the hydrogen supply pressure and the hydrogen supply temperature of hydrogen to be supplied to the hydrogen tank; and controlling hydrogen fueling by further applying the first information and the second information to the predetermined thermodynamic model.

The inner diameter value ($d_{FL}$) of the fueling line to be applied in the real case may be calculated based on Mathematical Expression 1 below, $$d_{FL} = d_{FL,ref} \times \left(\frac{K_{FL,ref}}{K_{FL}}\right)^{0.25} \quad \text{[Mathematical Expression 1]}$$

where $d_{FL,ref}$ is the inner diameter value of the predetermined reference fueling line, $K_{FL}$ is the calculated pressure loss coefficient value, and $K_{FL,ref}$ is the predetermined reference pressure loss coefficient value.

The reference case may be a case configured such that a temperature of the hydrogen tank is a maximum temperature 85° C. at the point in time when hydrogen fueling is finished.

A hydrogen dispenser for executing a real-time responding hydrogen fueling process to achieve the other object includes a memory and a dispenser controller configured to calculate a pressure loss coefficient value in a fueling line to be applied to a real case, wherein the dispenser controller is configured to calculate an inner diameter value of the fueling line to be applied in the real case based on the calculated pressure loss coefficient value, a predetermined reference pressure loss coefficient value for a reference case, and an inner diameter value of a predetermined reference fueling line for the reference case, the predetermined reference pressure loss coefficient value and an inner diameter value of a predetermined reference fueling line being stored in the memory, and execute the hydrogen fueling process by apply the calculated inner diameter value of the fueling line to a predetermined thermodynamic model for real-time hydrogen fueling in the real case.

The dispenser controller may be configured to obtain first information including information related to the real-time temperature of a hydrogen tank in a compressed hydrogen storage system, the real-time pressure of the hydrogen tank, and the real-time state of charge of the hydrogen tank and to determine whether at least one of the obtained real-time temperature of the hydrogen tank, the obtained real-time pressure of the hydrogen tank, and the obtained real-time state of charge of the hydrogen tank is equal to or greater than a predetermined value.

The dispenser controller may calculate the inner diameter value ($d_{FL}$) of the fueling line to be applied in the real case based on Mathematical Expression 1 below, $$d_{FL} = d_{FL,ref} \times \left(\frac{K_{FL,ref}}{K_{FL}}\right)^{0.25} \quad \text{[Mathematical Expression 1]}$$

where $d_{FL,ref}$ is the inner diameter value of the predetermined reference fueling line, $K_{FL}$ is the calculated pressure loss coefficient value, and $K_{FL,ref}$ is the predetermined reference pressure loss coefficient value. The reference case may be a case configured such that a temperature of the hydrogen tank is a maximum temperature 85° C. at the point in time when hydrogen fueling is finished.

A method of executing a real-time responding hydrogen fueling process by a compressed hydrogen storage system to achieve the other object includes transmitting first information including information related to the real-time temperature of a hydrogen tank, the real-time pressure of the hydrogen tank, and the real-time state of charge of the hydrogen tank and performing fueling of hydrogen supplied according to a pressure ramp rate calculated by a predetermined thermodynamic model for real-time hydrogen fueling by applying the first information and an inner diameter value of a fueling line calculated so as to be applied to a real case, wherein the inner diameter value of the fueling line to be applied in the real case is calculated based on the calculated pressure loss coefficient value, a predetermined reference pressure loss coefficient value for a reference case, and an inner diameter value of a predetermined reference fueling line for the reference case. The reference case may be a case configured such that a temperature of the hydrogen tank is a maximum temperature 85° C. at the point in time when hydrogen fueling is finished.

A compressed hydrogen storage system for executing a real-time responding hydrogen fueling process to achieve the further object includes a transmission unit configured to transmit first information including information related to the real-time hydrogen tank temperature and the real-time hydrogen tank pressure and a hydrogen tank configured to perform fueling of hydrogen supplied according to a pressure ramp rate calculated by a predetermined thermodynamic model for real-time hydrogen fueling by applying the first information and an inner diameter value of a fueling line calculated so as to be applied to a real case, wherein the inner diameter value of the fueling line to be applied in the real case is calculated based on the calculated pressure loss coefficient value, a predetermined reference pressure loss coefficient value for a reference case, and an inner diameter value of a predetermined reference fueling line for the reference case.

Advantageous Effects

According to an embodiment of the present invention, a CHSS reflects structural information and thermodynamic information of a hydrogen tank to be transmitted to a hydrogen dispenser through wireless communication during hydrogen fueling, whereby it is possible to safely and rapidly perform hydrogen fueling. The pressure and temperature of hydrogen in the hydrogen tank measured in real time are transmitted to the hydrogen dispenser, and the hydrogen dispenser calculates the optimum pressure ramp rate and performs fueling at the calculated optimum pressure ramp rate, whereby it is possible to minimize fueling time within a range in which the pressure, the temperature, and the fueling flow rate of hydrogen in the hydrogen tank do not deviate from predetermined critical values.

In addition, the existing hydrogen fueling prescribed in SAE J2601 is possible only in the state in which the hydrogen tank (110) is precooled (e.g. to −17.5° C.). If not, the temperature of the hydrogen tank rises sharply, whereby the temperature of the hydrogen tank rapidly reaches 85° C. In a hydrogen fueling method according to the present invention, however, hydrogen fueling is possible even though the temperature of the hydrogen tank (110) is maintained at about 30° C.

Also, in the hydrogen fueling method according to the present invention, hydrogen fueling is possible even though the pressure of the hydrogen tank is maintained at about atmospheric pressure.

Also, in the hydrogen fueling method according to the present invention, application is possible without limiting the capacity of the hydrogen tank, the supply of hydrogen is easy to change, and the flow rate is not limited, whereby a wide variety of applications is possible.

Also, in the hydrogen fueling method according to the present invention, the prr is calculated to perform hydrogen fueling in consideration of the temperature, the pressure, etc. of the hydrogen tank based on real-time communication, whereby there is an advantage in that it is possible to more efficiently perform hydrogen fueling, and therefore precise control is possible.

In addition, thermodynamic characteristics of the fueling system are proportionally simulated using the reference of a hot case, whereby efficiency of a hydrogen fueling protocol is considerably improved.

Effects obtainable from the present invention are not limited by the above mentioned effects, and other unmentioned effects will be clearly understood by those skilled in the art to which the present invention pertains based on the following description.

DESCRIPTION OF DRAWINGS

Effects obtainable from the present invention are not limited by the above mentioned effects, and other unmentioned effects will be clearly understood by those skilled in the art to which the present invention pertains based on the following description.

BEST MODE

Figure 1:
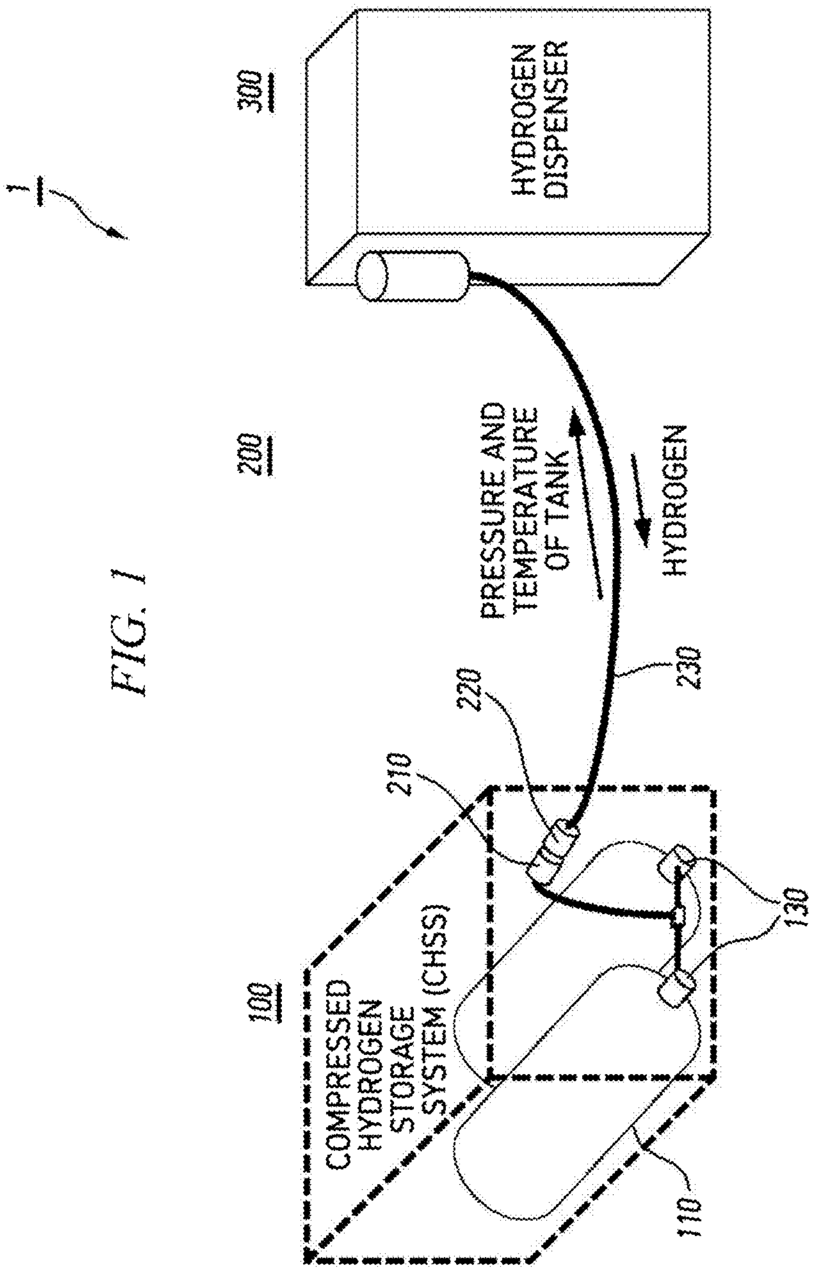
FIG. 1 is a view for explaining a real-time responding hydrogen fueling system according to an embodiment of the present invention.

Hereinafter, embodiments of the present invention will be described with reference to the accompanying drawings, and the present invention will be described in detail to the extent to which a person having ordinary skill in the art to which the present invention pertains can easily implement the present invention. However, the present invention may be implemented in various different forms and is not limited to the embodiments described herein. Meanwhile, parts having no relation to the description of the present invention are omitted from the drawings in order to clearly describe the present invention, and similar parts are denoted by similar reference numerals throughout the specification.

When a certain part "includes" a certain element throughout the specification, this means that another element is not excluded but is further included, unless mentioned otherwise, and it should be understood that this does not preclude the presence or addition of one or more other features, numbers, steps, operations, elements, components, or combinations thereof.

A real-time hydrogen fueling control method has been researched and developed, and there is a control method of measuring the difference between target temperature and sensed temperature in real time when hydrogen fueling is performed from a hydrogen dispenser to a compressed hydrogen storage receptacle, controlling the hydrogen fueling flow such that the sensed temperature reaches the target temperature, measuring the degree of deformation of the compressed hydrogen storage receptacle in real time, and stopping hydrogen fueling when deformation beyond the regulations is sensed based on the degree of deformation.

Even though the above method is used, however, it is not based on a protocol developed in a situation in which real-time communication is actually assumed, and therefore real-time hydrogen control is impossible. In addition, since the reason that the protocol is complicated is that the case in which communication between a fueling station and a hydrogen vehicle is not possible and the case in which communication is not reliable are assumed, there is a need to research and develop a standardized protocol capable of enabling continuous communication and guaranteeing reliability in communication. If reliability in communication is guaranteed, it is possible to calculate a pressure ramp rate and a target pressure in real time while monitoring and predicting the temperature and the pressure of hydrogen, which are hazards, in real time and to simply prepare a protocol. Therefore, there is a need to research a robust communication protocol and a control method for real-time monitoring.

The present invention proposes a new HFP capable of remarkably reducing limitations in the application range and the application method of the existing HFP and low efficiency thereof. In consideration of the fact that problems of the existing HFP are based on non-communication, the goal of the new HFP is dedicated communication. In order to develop the new HFP, two thermodynamic models were prepared. One is a predetermined thermodynamic model that serves as a control engine of a fueling process (as an example, a simple thermodynamic model (STM)), and the other is a so-called rigorous thermodynamic model (RTM) that serves a testbed for the new HFP. The new HFP proposed by the present invention is defined as a real-time responding hydrogen fueling protocol (RTR-HFP).

Hereinafter, the present invention will be described in detail with reference to the accompanying drawings.

Figure 2:
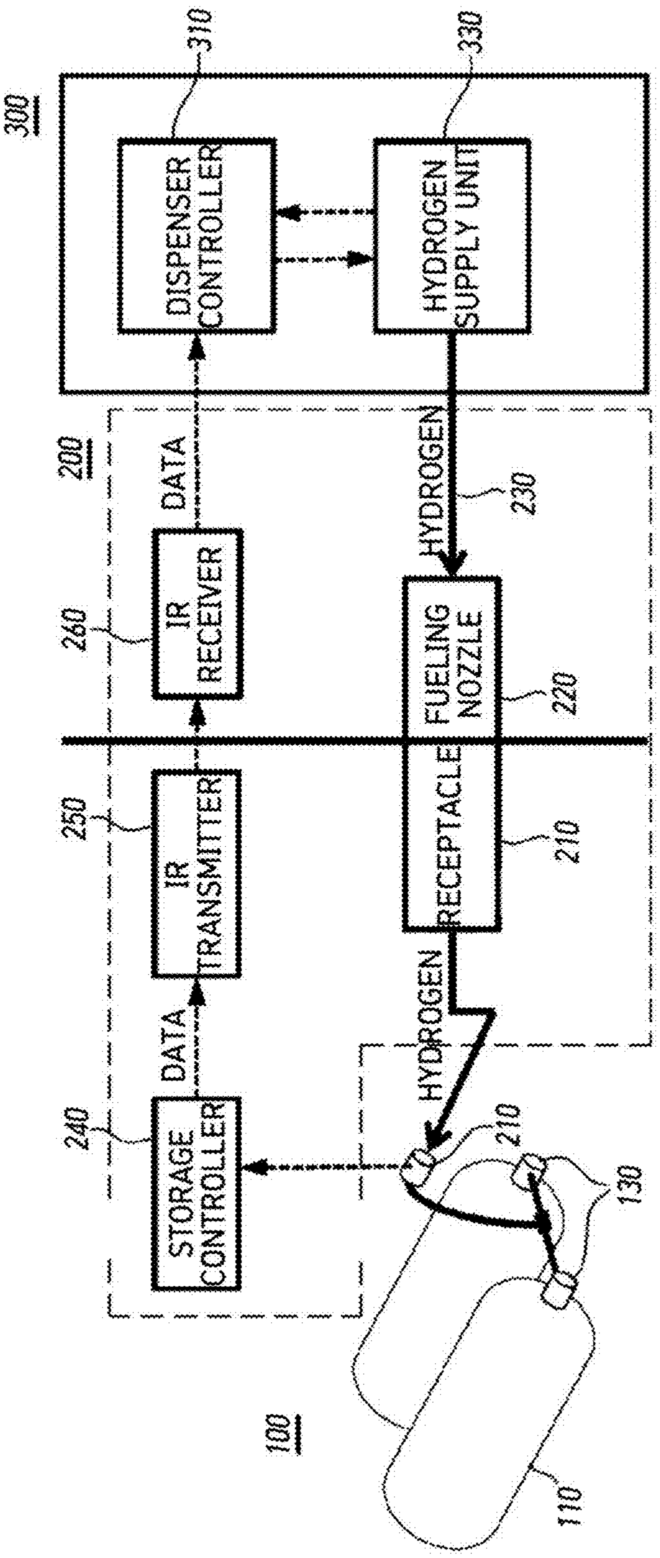
FIG. 2 is a block diagram for explaining internal elements included in the system of FIG. 1.

FIG. 1 is a view for explaining a real-time responding hydrogen fueling system according to an embodiment of the present invention, and FIG. 2 is a block diagram for explaining internal elements included in the system of FIG. 1.

Referring to FIG. 1, the real-time responding hydrogen fueling system may include at least one compressed hydrogen storage system (CHSS) 100, a hydrogen transfer device 200, and a hydrogen dispenser 300. However, the real-time responding hydrogen fueling system of the CHSS for fuel cells of FIG. 1 is merely an embodiment of the present invention, and therefore the present invention is not limited by FIG. 1. The CHSS 100 may be provided in a hydrogen vehicle, etc.

The elements of FIG. 1 are generally connected to each other over a network. For example, as shown in FIG. 1, the at least one CHSS 100 may be connected to the hydrogen transfer device 200 over the network. The hydrogen transfer device 200 may be connected to the at least one CHSS 100 and the hydrogen dispenser 300 over the network. In addition, the hydrogen dispenser 300 may be connected to the hydrogen transfer device 200 over the network.

Here, the network means a connection structure that allows information to be exchanged between nodes, such as a plurality of terminals and a plurality of servers. Examples of the network include local area network (LAN), wide area network (WAN), world wide web (WWW), wired and wireless data communication networks, telephone network, and wired and wireless data television communication networks. Examples of the wireless data communication network include 3G, 4G, 5G, 3rd generation partnership project (3GPP), 5th generation partnership project (5GPP), long term evolution (LTE), world interoperability for microwave access (WIMAX), Wi-Fi, the Internet, local area network (LAN), wireless local area network (Wireless LAN), wide area network (WAN), personal area network (PAN), radio frequency (RF), Bluetooth network, near-field communication (NFC) network, satellite broadcasting network, analog broadcasting network, and digital multimedia broadcasting (DMB) network; however, the present invention is not limited thereto.

In the following description, "at least one" is defined as a term including one or more, and it is obvious that each element may be provided in singular or plural and may mean one or more although "at least one" is not expressed. In addition, each element may be differently provided in singular or plural depending on embodiments.

Hereinafter, the elements of FIG. 1 will be described with further reference to FIG. 2.

The compressed hydrogen storage system (CHSS) 100 may include a hydrogen tank 110 and a hydrogen tank valve 130. Although two hydrogen tanks are illustrated in FIGS. 1 and 2, one or more hydrogen tank may be provided. The CHSS 100, which is installed in a hydrogen vehicle (or a transportation means), is configured to receive and store hydrogen, which is a fuel. The hydrogen tank valve 130 may include a pressure sensor and a temperature sensor, which measure the pressure and the temperature of hydrogen in the hydrogen tank 110, and may function to transmit measured values to a storage controller 240 of the hydrogen transfer device 200.

The hydrogen transfer device 200 may include a receptacle 210 configured to deliver hydrogen jetted from a hydrogen supply unit 330 to the hydrogen tank valve 130, a wireless communication unit configured to perform wireless communication between a hydrogen supply hose 230 and a dispenser controller 310 in the hydrogen dispenser 300, and a storage controller 240 configured to convert sensed data into data for wireless communication and to output the converted data. The hydrogen transfer device 200 may further include a fueling nozzle 220 connected to the receptacle 210 and the hydrogen supply unit 330 therebetween, the fueling nozzle being configured to supply hydrogen to the hydrogen tank 110 via the hydrogen tank valve 130. The wireless communication unit may include a transmitter (IR transmitter as an example) 250 installed at the other side of the storage controller 240 installed at one side of the receptacle 210, from which hydrogen is injected into the vehicle, and a receiver (IR receiver as an example) 260 having one side connected to the IR transmitter 250 and the other side connected to the dispenser controller 310.

The hydrogen dispenser 300 may include a dispenser controller 310 configured to receive sensed data, including the pressure and temperature in the hydrogen tank 110, and a hydrogen supply unit 330 configured to supply hydrogen into the hydrogen tank 110 based on the sensed data. The dispenser controller 310 may receive data from the wireless communication unit and the hydrogen supply unit 330, may calculate a real-time pressure ramp rate in the hydrogen supply unit 330, and may transmit the calculated pressure ramp rate to the hydrogen supply unit 330.

Referring to FIGS. 1 and 2, it can be seen that the CHSS 100 receives hydrogen from the hydrogen dispenser 300 according to real-time responding hydrogen fueling control. In order to perform real-time responding hydrogen fueling control, a transmission unit (not shown) of the CHSS 100 is configured to transmit information to the hydrogen transfer device 200 and/or the hydrogen dispenser 300. The transmission unit (not shown) of the CHSS 100 is configured to transmit information to the hydrogen transfer device 200 and/or the hydrogen dispenser 300 through wireless communication. In the initial stage, the transmission unit of the CHSS 100 may transmit information about the temperature of the hydrogen tank 110, the pressure of the hydrogen tank 110, and the state of charge (SOC) of the hydrogen tank 110 to the hydrogen transfer device 200 through wireless communication. When the pressure of the hydrogen tank 110 is less than a predetermined pressure, the hydrogen tank stores the hydrogen supplied from the hydrogen dispenser at a first fixed pressure ramp rate set based on a predetermined fixed pressure ramp rate without using a predetermined thermodynamic model in the hydrogen dispenser. When the pressure of the hydrogen tank 110 is not less than the predetermined pressure, on the other hand, the hydrogen tank may store the hydrogen supplied from the hydrogen dispenser depending on whether a second pressure ramp rate set as an initial pressure ramp rate is increased, decreased, or maintained in the hydrogen dispenser.

The hydrogen tank valve 130 may be configured to measure the temperature of the hydrogen tank 110 and the pressure of the hydrogen tank 110. In addition, the transmission unit of the CHSS 100 may transmit information about the number of the hydrogen tanks 110 and the volume of the hydrogen tank 110 to the hydrogen transfer device 200 through wireless communication such that the information is transmitted to the hydrogen dispenser 300.

Hereinafter, the operation process of the real-time responding hydrogen fueling system of FIGS. 1 and 2 described above based on the construction thereof will be described in detail with reference to FIGS. 3 to 7. However, it is obvious that the following embodiment is merely one of various embodiments of the present invention, and therefore the present invention is not limited thereto.

Figure 3:
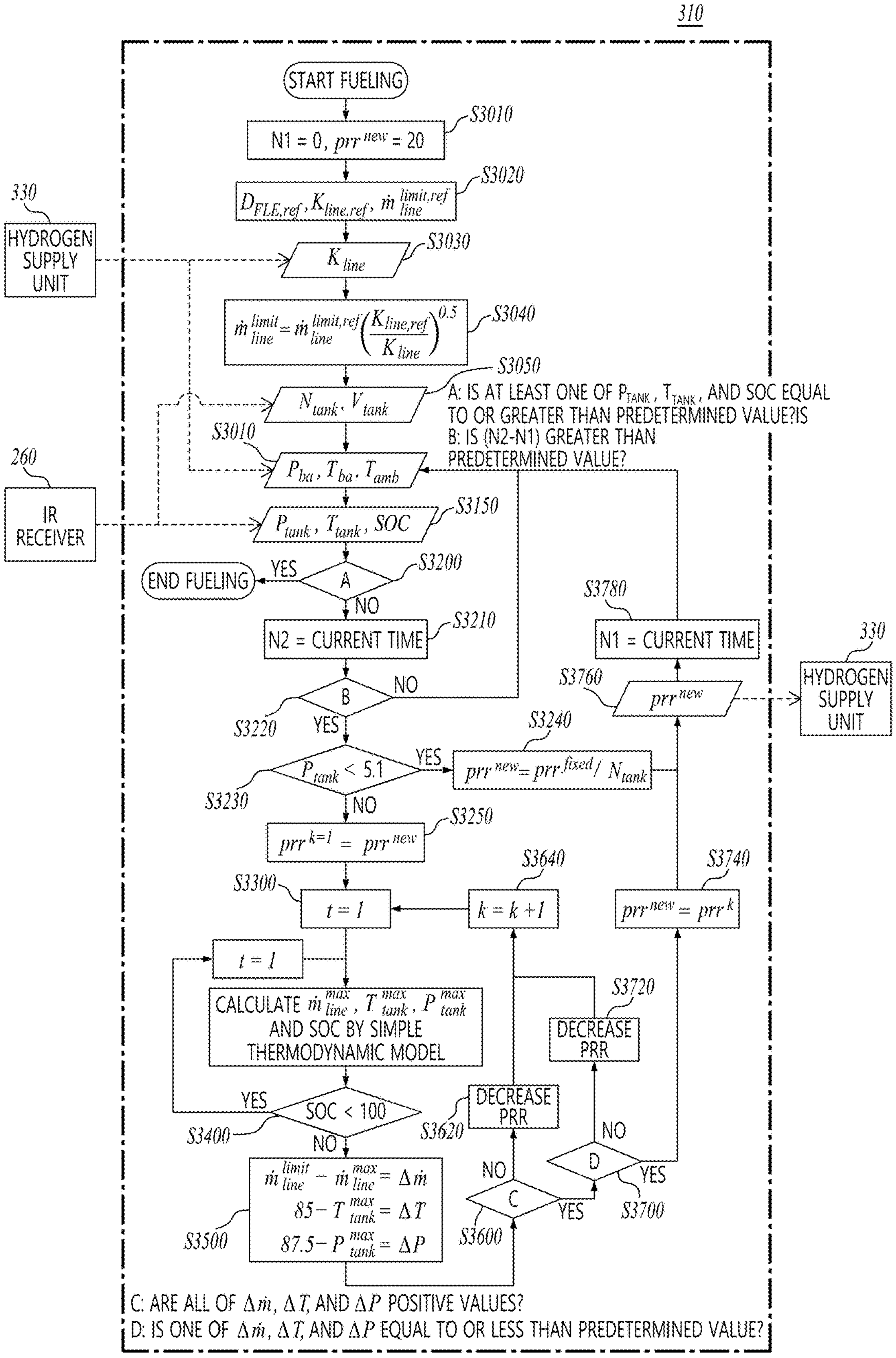
FIG. 3 is an illustrative flowchart for explaining a real-time responding hydrogen fueling method according to an embodiment of the present invention.

FIG. 3 is an illustrative flowchart for explaining a real-time responding hydrogen fueling method according to an embodiment of the present invention.

Referring to FIG. 3, the real-time responding hydrogen fueling system according to the embodiment of the present invention is configured such that, in order to more safely and rapidly achieve hydrogen fueling, the CHSS 100 reflects structural information and thermodynamic information of the hydrogen tank that are transmitted to the hydrogen dispenser 300 through wireless communication during hydrogen fueling. To this end, the CHSS 100 measures the pressure and temperature of hydrogen in the hydrogen tank 110 in real time and transmits the measured pressure and temperature of the hydrogen in the hydrogen tank to the hydrogen dispenser 300 through wireless communication, and the hydrogen dispenser 300 receives the pressure and temperature of the hydrogen tank measured in real time, calculates an optimum pressure ramp rate, and performs hydrogen fueling at the calculated optimum pressure ramp rate. As a result, fueling time is minimized within a range in which the pressure, the temperature, and the fueling flow rate of hydrogen in the hydrogen tank 110 do not deviate from predetermined critical values.

Hereinafter, abbreviations described in FIGS. 3 and 4 will be summarized in Table 1 below, and a duplicate description thereof will be omitted.

TABLE 1

| | |
|---|---|
| prr | Pressure ramp rate, MPa/s |
| $\dot{m}$ | Mass flow rate of compressed hydrogen, kg/s |
| t | Time counted for HRS, m/s |
| ρ | Gas density, kg/m3 |

TABLE 1-continued

| | |
|---|---|
| ba | Break away |
| inlet | Inlet of vehicle tank |
| line (or FL) | Hydrogen fueling line |
| max | Maximum value |
| new | New parameter to continue simulation |
| Cv | Specific heat capacity at constant volume, kJ/kg · K |
| Cp | Specific heat capacity at constant pressure, kJ/kg · K |
| hs | Stagnation enthalpy, kJ/kg |
| N | Number of tanks |
| K | Pressure drop (or loss) coefficient of fueling line, $m^{-4}$ |
| k | Number of prr calculations |
| $D_{FLE}$ Or $d_{FLE}$ | Equivalent Diameter of fueling line, m |
| u | Internal energy, kJ/kg |
| Tank (or tk) | Vehicle tank |
| R | Universal gas constant (8.314472), J/mol · K |
| m | Mass of compressed hydrogen, kg |
| V | Volume, m3 |
| P | Pressure, MPa |
| T | Temperature, K |
| h | Static enthalpy, kJ/kg |
| Z | Compressibility factor |
| SOC | State Of Charge, % |
| d or D | Diameter of tank inlet tube |
| Q | Heat transferred, kJ |
| Z | Compressibility factor |
| ba | Break Away |
| k | Number of prr calculations |

FIG. 3 shows all steps of a process of the dispenser controller 310 receiving data from the IR receiver 260 and the hydrogen supply unit 330, calculating a new pressure ramp rate (optimum pressure ramp rate) $prr^{new}$, and transmitting the calculated pressure ramp rate to the hydrogen supply unit 330. To this end, the dispenser controller 310 of the hydrogen dispenser 300 is operated according to the logic or algorithm shown in FIG. 3. In FIG. 3, $\dot{m}$ is the mass flow rate (or mass flow) (kg/s) of (compressed) hydrogen. The mass flow rate may mean mass passing per unit time. When fueling is commenced, the new pressure ramp rate (optimum pressure ramp rate) $prr^{new}$ may be set as a predetermined value, and time N1 may be set to 0. A value obtained by dividing 20 MPa/min by the number of the hydrogen tanks 110 may be used as an initial pressure ramp rate prr for calculating the new pressure ramp rate $prr^{new}$. Since the new pressure ramp rate $prr^{new}$ is calculated through hydrogen fueling simulation based on initial values of these variables and the calculated new pressure ramp rate is applied to hydrogen fueling, the initial pressure ramp rate prr is not substantially important. In an embodiment of the present invention, 20 MPa/min may be adopted as an example of a median of experimentally known values in order to reduce time taken to search for a proper initial pressure ramp rate prr. Here, as an example, when fueling is commenced, $prr^{new}$ is illustrated as being 20 MPa/min (S3010).

A memory (not shown) of the hydrogen dispenser 300 may store in advance information about a reference fueling line diameter (inner diameter) value (or reference value of fueling line diameter) $D_{FLE,ref}$, a reference pressure loss coefficient value $K_{line,ref}$, and a reference mass flow rate limit value $$\dot{m}_{line}^{limit,ref},$$

which are values for an existing hot case (or reference case) (S3020).

The hot case and a real case will be described in detail with reference to FIG. 5. In brief, the hot case means a fueling condition in which the temperature of gas in the CHSS tank is the highest at the point in time when fueling is finished (identical to a hot case prescribed in SAE J2601). That is, as prescribed in SAE J2601, a fueling line inner diameter value $d_{FL}$ at which the temperature of the CHSS tank is 85° C. is defined as a reference fueling line inner diameter $D_{FL,ref}$. The pressure loss coefficient of the fueling line calculated in the hot case condition (ΔP=35 MPa) is defined as $K_{FL,ref}$, which is called a reference pressure loss coefficient. Here, $D_{FLE}=D_{FL}$, $D_{FLE,ref}=D_{FL,ref}$, and $K_{line}=K_{FL}$.

The dispenser controller 310 may obtain (or collect) initial state values from the hydrogen tank 110 in the CHSS 100 and the hydrogen supply unit 330 of the hydrogen dispenser 300. The initial state values may include structural variable values of the hydrogen tank 110, a structural variable value of the hydrogen transfer device 200, initial thermodynamic variable values of gas supplied by the hydrogen dispenser 300, and thermodynamic variable values of hydrogen in the hydrogen tank 110.

The structural variable values of the hydrogen tank 110 may include the number $N_{tank}$ of the hydrogen tanks 110 and the volume $V_{tank}$ of the hydrogen tank 110. At this time, it is assumed that all of the structural variable values of the hydrogen tank 110 mounted in one CHSS 100 are equal to each other. That is, it is assumed that the number and volume of all hydrogen tanks 110 included in the CHSS 100 are standardized. The dispenser controller 310 may obtain information about the number $N_{tank}$ of the hydrogen tanks 110 and the volume $V_{tank}$ of the hydrogen tank 110 by receiving the same through the IR receiver 260 (S3050). Since the number of the hydrogen tanks and the volume of the hydrogen tank 110 are inherent values of the CHSS 100, it may be sufficient to receive the same once before fueling commencement (S3050).

The structural variable value of the hydrogen transfer device 200 may include the pressure loss coefficient $K_{line}$ of the hydrogen transfer device 200 measured by the hydrogen supply unit 330. Since this value is an inherent value of the hydrogen transfer device 200, which is called a fueling line or a hydrogen fueling line, it is sufficient to receive the same only once before fueling commencement. However, since the pressure loss coefficient $K_{line}$ may be changed depending the kind of the CHSS 100 although the pressure loss coefficient is an inherent value of the hydrogen transfer device 200, the pressure loss coefficient $K_{line}$ of the entirety of the hydrogen transfer device 200 may be changed depending the kind of the CHSS 100. This valve may be found by substituting the pressure loss value $\Delta P_{line}$ and the density value $\rho_{line}$ of hydrogen in the hydrogen transfer device 200 found when leakage of the hydrogen transfer device 200 is inspected before commencement of fueling to a new CHSS 100 into Mathematical Expression 1 below.

Since an actual fueling line is constituted by a tube having a small inner diameter and a plurality of components, a substantial pressure drop occurs during compressed hydrogen fueling. Mathematical Expression 1 below may be represented as an example of an expression for calculating the pressure drop.

$$\Delta P_{line} = K_{line}\frac{\dot{m}_{line}^2}{\rho_{line}} \quad \text{[Mathematical Expression 1]}$$

Here, $\dot{m}_{line}$ is a mass flow rate or a hydrogen flow rate. The mass flow rate may mean mass passing per unit time.

The dispenser controller 310 may calculate the value of the pressure loss coefficient $K_{line}$ for hydrogen supplied from the hydrogen supply unit 330 (S3030).

The reference pressure loss coefficient value $K_{line,ref}$ and the reference mass flow rate limit value $$\dot{m}_{line}^{limit,ref}$$

may be a reference pressure loss coefficient value (when ΔP is 35 MPa) and a reference mass flow rate limit value (60 g/s as an example) in the hot case condition prescribed in SAE J2601. When the mass flow rate limit value $$\dot{m}_{line}^{limit}$$

thus found is applied, the mass flow rate limit value $$\dot{m}_{line}^{limit}$$

may increase if the value of the pressure loss coefficient $K_{line}$ decreases as the result of performance improvement due to an increase in diameter of the fueling line, whereby it is possible to shorten fueling time. When the fueling time is shortened, there is an advantage in that efficiency in operation of a fueling station is improved.

The dispenser controller 310 may calculate the mass flow rate limit value $$\dot{m}_{line}^{limit}$$

based on the prestored reference pressure loss coefficient value $K_{line,ref}$, the calculated pressure loss coefficient value, and the prestored reference mass flow rate limit value $$\dot{m}_{line}^{limit,ref}$$

(S3040). Mathematical Expression 2 below may be represented as an example of an expression for calculating the mass flow rate limit value $$\dot{m}_{line}^{limit}.$$

$$\dot{m}_{line}^{limit} = \dot{m}_{line}^{limit,ref}\left(\frac{K_{line,ref}}{K_{line}}\right)^{0.5} \quad \text{[Mathematical Expression 2]}$$

However, 60 g/s, 120 g/s, or 240 g/s preset as the reference mass flow rate limit value in SAE J2601 may be used without calculation of the mass flow rate limit value, unlike S3040.

The initial thermodynamic variable values of gas (hydrogen gas) supplied by the hydrogen dispenser 300 may include the pressure $P_{ba}$ and the temperature $T_{ba}$ of hydrogen supplied by the hydrogen dispenser 300 and the ambient temperature $T_{amb}$ measured in the vicinity of the hydrogen dispenser 300. Since the pressure $P_{ba}$ and temperature $T_{ba}$ of hydrogen supplied by the hydrogen dispenser 300 and the ambient temperature $T_{amb}$ measured in the vicinity of the hydrogen dispenser 300 are dynamic parameters, the dispenser controller 310 may receive information about the pressure $P_{ba}$ and the temperature $T_{ba}$ of hydrogen supplied by the hydrogen dispenser 300 and the ambient temperature $T_{amb}$ measured in the vicinity of the hydrogen dispenser 300 from the hydrogen supply unit 330 in real time (S3100). That is, the pressure $P_{ba}$ and the temperature $T_{ba}$ of hydrogen supplied by the hydrogen dispenser 300 and the ambient temperature $T_{amb}$ measured in the vicinity of the hydrogen dispenser 300, received from the hydrogen supply unit 330, may be updated in a predetermined cycle.

The thermodynamic variable values of hydrogen in the hydrogen tank 110 may include the pressure $P_{tank}$, the temperature $T_{tank}$, and state of charge (SOC) of the hydrogen tank 110 collected from the temperature sensor (not shown) and the pressure sensor (not shown) at the CHSS 100 (S3150). Since the pressure $P_{tank}$, the temperature $T_{tank}$, and the state of charge (SOC) of the hydrogen tank 110 are dynamic parameters, the dispenser controller 310 may receive the pressure $P_{tank}$, the temperature $T_{tank}$, and the state of charge (SOC) of the hydrogen tank 110 from the IR receiver 260 in real time. Here, real-time reception may include reception in a predetermined cycle (e.g. 2 seconds). The dispenser controller 310 may calculate the state of charge (SOC) of the hydrogen tank 110 based on the received pressure $P_{tank}$ and temperature $T_{tank}$ of the hydrogen tank. That is, the pressure $P_{tank}$ and the temperature $T_{tank}$ of the hydrogen tank 110 may be updated in a predetermined cycle, and therefore the state of charge (SOC) of the hydrogen tank may be updated in a predetermined cycle.

The dispenser controller 310 may determine whether at least one (or one or more) of the pressure $P_{tank}$, the temperature $T_{tank}$, and the state of charge (SOC) of the hydrogen tank 110 is equal to or greater than a predetermined value (S3200).

When at least one (or one or more) of the pressure $P_{tank}$, the temperature $T_{tank}$, and the state of charge (SOC) of the hydrogen tank 110 is equal to or greater than the predetermined value, fueling is finished. When each of the pressure $P_{tank}$, the temperature $T_{tank}$, and the state of charge (SOC) of the hydrogen tank 110 is less than the predetermined value, on the other hand, the dispenser controller 310 checks elapsed time (N2-N1). To this end, first, the dispenser controller 310 checks the current time N2 (S3210). The dispenser controller 310 calculates the elapsed time between the current time N2 and the initial fueling time N1 and determines whether the calculated elapsed time is greater than a predetermined value (or time) (S3220). When the calculated elapsed time is not greater than the predetermined value (or time), which means that sufficient time has not elapsed, the dispenser controller 310 returns to step S3100 and performs the process.

After returning to step S3100, the dispenser controller 310 may receive information about at least one of the pressure $P_{ba}$ and the temperature $T_{ba}$ of hydrogen supplied by the hydrogen dispenser 300 and the ambient temperature $T_{amb}$ measured in the vicinity of the hydrogen dispenser 300 from the hydrogen supply unit 330 in real time, and may perform subsequent steps of the process.

As described above, the hydrogen tank valve 130 of the CHSS 100 transmits or delivers information about the real-time temperature of the hydrogen tank, the real-time pressure of the hydrogen tank, and the real-time state of charge of the hydrogen tank to the hydrogen transfer device 200. The hydrogen dispenser 300 may calculate a pressure ramp rate from a predetermined thermodynamic model for real-time hydrogen fueling, to which the information about the real-time temperature of the hydrogen tank, the real-time pressure of the hydrogen tank, and the real-time state of charge of the hydrogen tank and the inner diameter value of the fueling line calculated so as to be applied to the real case are applied, and the hydrogen tank 110 may receive and store hydrogen supplied from the hydrogen dispenser 300 according to the calculated pressure ramp rate. Here, the inner diameter value of the fueling line to be applied to the real case is calculated based on the calculated pressure loss coefficient value, the reference pressure loss coefficient value preset for the reference case, and the reference fueling line inner diameter value preset from the reference case.

When the calculated elapsed time (N2-N1) is greater than the predetermined value (or time), on the other hand, the dispenser controller 310 determines whether the pressure $P_{tank}$ of the hydrogen tank 110 is less than a predetermined pressure (e.g. 5.1 MPa or 2 MPa) (S3230). Here, the predetermined pressure is a pressure related to driving stability of the thermodynamic model according to the present invention. Specifically, the predetermined pressure may be defined as a value selected through iterative simulation in consideration of both a characteristic in which driving stability of the thermodynamic model is lost when the value of the hydrogen tank 110 is too high and a characteristic in which the fueling velocity is reduced when the value thereof is too low (2 MPa or 5 MPa as absolute pressure or 2.1 MPa or 5.1 MPa as gauge pressure). Here, the absolute pressure means pressure measured in complete vacuum, and the gauge pressure (or meter pressure) means pressure measured under atmospheric pressure. The dispenser controller 310 determines whether the pressure $P_{tank}$ of the hydrogen tank 110 is applied to a predetermined thermodynamic model for hydrogen fueling based on whether the pressure of the hydrogen tank is less than the predetermined pressure (e.g. 2 MPa or 5 MPa as absolute pressure or 2.1 MPa or 5.1 MPa as gauge pressure) (S3230). That is, the dispenser controller 310 determines whether to use a predetermined thermodynamic model (e.g. STM) for real-time responding hydrogen fueling based on whether the obtained pressure of the hydrogen tank is less than the predetermined pressure (S3230).

When the pressure of the hydrogen tank 110 is less than the predetermined pressure, a new pressure ramp rate may be calculated using a fixed pressure ramp rate $prr^{fixed}$ and the calculated new pressure ramp rate may be applied. In the state in which the pressure of the hydrogen tank 110 is less than the predetermined pressure, there is a characteristic in which the pressure of gas in the hydrogen tank 110 sharply rises with progress of hydrogen fueling. When the temperature of the hydrogen tank 110 sharply rises, temperature control may be difficult and much time may be taken to search for a new optimum pressure ramp rate $prr^{new}$ or there is a search failure possibility, whereby operability of the real-time responding hydrogen fueling protocol is sharply deteriorated. The predetermined pressure, based on which prr is calculated as a simple thermodynamic model or the fixed prr is selected and applied in the real-time responding hydrogen fueling protocol through much research, may be 5.1 MPa or 2 MPa, more preferably 2 MPa. Here, 5.1 MPa or 2 MPa is mentioned as an example of the predetermined pressure.

In order to solve such a problem, the fixed pressure ramp rate $prr^{fixed}$ is applied when the pressure $P_{tank}$ of gas in the hydrogen tank 110 is less than the predetermined pressure. Here, the predetermined pressure (e.g. initial lower bound pressure of the hydrogen tank) may be 5.1 MPa (absolute pressure). When the pressure $P_{tank}$ of the hydrogen tank 110 is less than the predetermined pressure (e.g. 5.1 MPa) and the number of hydrogen tanks 110 is greater than 1, a value obtained by dividing the fixed pressure ramp rate $prr^{fixed}$ by the number $N_{tank}$ of the hydrogen tanks 110 may be applied (S3240). This considers that the hydrogen tank 110 is connected to the hydrogen fueling line in parallel. Here, an average pressure ramp rate APRR for non-communication fueling of a lookup table-based fueling protocol of SAE J2601 or a pressure ramp rate derived using a method equivalent thereto or more may be used as an example of the fixed pressure ramp rate $prr^{fixed}$. When the pressure of the hydrogen tank is less than the predetermined pressure, the dispenser controller 310 may determine a new pressure ramp rate based on the predetermined fixed pressure ramp rate $prr^{fixed}$ without using a predetermined thermodynamic model (e.g. STM), and may apply the determined new pressure ramp rate to hydrogen fueling. In addition, the dispenser controller 310 may transmit information about the determined new pressure ramp rate to the hydrogen supply unit 330 (S3760), and the hydrogen supply unit 330 may supply hydrogen according to the determined new pressure ramp rate.

As described above, the dispenser controller 310 transmits the new pressure ramp rate calculated in step S3240 to the hydrogen supply unit 330, and performs control such that the hydrogen dispenser performs hydrogen fueling according to the set new pressure ramp rate. In this case, the simple thermodynamic model is not applied. The reason for this is that, when the pressure of the hydrogen tank 110 is less than the predetermined pressure, as described above, the temperature of the hydrogen tank 110 sharply rises, whereby accurate control is difficult, and therefore the fixed pressure ramp rate is applied, whereby it is possible to shorten hydrogen fueling time while performing safe and accurate control. The hydrogen supply unit 330 may supply hydrogen through the fueling line according to the received pressure ramp rate.

After calculating the new pressure ramp rate $prr^{new}$, the dispenser controller 310 sets the initial fueling time N1 to the current time, not 0 (S3780), returns to step S3100, and performs the process. In addition, the dispenser controller 310 may transmit information about the calculated new pressure ramp rate $prr^{new}$ to the hydrogen supply unit 330 (S3760).

When the pressure $P_{tank}$ of the hydrogen tank 110 is not less than the predetermined pressure, $prr^{k=1}$ set in step S3010 may be set as $prr^{new}$ (=20 MPa/min) as an example of a predetermined prr value (S3250). That is, when the pressure $P_{tank}$ of the hydrogen tank 110 is not less than the predetermined pressure, the dispenser controller 310 may apply the pressure ramp rate ($prr^{new}$=20 MPa/min in FIG. 3) set as the initial pressure ramp rate to the STM, and may apply the same to hydrogen fueling.

Subsequently, time t is set 1 (t=1) (S3300). The dispenser controller 310 may determine the mass flow rate and the temperature, the pressure, and the state of charge of the hydrogen tank 110 using the prestored thermodynamic model (hereinafter referred to as a simple thermodynamic model as an example) based on the initial stat value (S400). As a hydrogen fueling simulation step, the mass flow rate $\dot{m}_{line}$, the pressure $P_{tank}$ of the hydrogen tank 110, the temperature $T_{tank}$ of the hydrogen tank 110, and the state of charge (SOC) of the hydrogen tank are calculated using the simple thermodynamic model based on given initial values and the calculated pressure ramp rate value, and the maximum mass flow rate $$\dot{m}_{line}^{max},$$

the maximum hydrogen tank temperature $$T_{tank}^{max},$$

the maximum hydrogen tank pressure $$P_{tank}^{max},$$

and the SOC value are determined or calculated using a method of selecting a relatively large value through comparison with the preceding maximum value (S4000). That is, the dispenser controller 310 calculates the maximum mass flow rate $$\dot{m}_{line}^{max},$$

the maximum hydrogen tank temperature $$T_{tank}^{max},$$

the maximum hydrogen tank pressure $$P_{tank}^{max},$$

and the SOC value using the initial values obtained in step S3010 to step S3300 and the values calculated in step S3010 to step S3300 (S400). The calculation process by the (simple) thermodynamic model will be described below in detail with reference to FIG. 6.

The dispenser controller 310 determines whether the calculated state of charge (state of charge of hydrogen, SOC) is less than 100 (S3400). When the calculated state of charge is less than 100, the dispenser controller determines that fueling has not yet been completed, sets time so as to be increased by Δt (Δt=1 as an example), and repeats the calculating process of the simple thermodynamic model. When the state of charge (SOC) is equal to or greater than 100, the iterative calculation is stopped.

When the calculated state of charge is equal to or greater than 100, the dispenser controller 310 may calculate the difference between each of the determined maximum mass flow rate $$\dot{m}_{line}^{max},$$

maximum hydrogen tank temperature $$T_{tank}^{max},$$

and maximum hydrogen tank pressure $$P_{tank}^{max}$$

and a corresponding one of predetermined safe critical values (S3500). Here, the predetermined safe critical value related to the maximum mass flow rate may be referred to as a first safe critical value. As an example, the first safe critical value, which is the safe critical value related to the maximum mass flow rate, may be set as the mass flow rate limit value $$\dot{m}_{line}^{limit}$$

determined in S3040. Consequently, the first safe critical value may be 60 g/s, 120 g/s, or 240 g/s preset as the reference mass flow rate limit value in SAE J2601.

In addition, the predetermined safe critical value related to the maximum hydrogen tank temperature may be referred to as a second safe critical value (80° C. as an example), and the predetermined safe critical value (87.5 MPa as an example) related to the maximum hydrogen tank pressure may be referred to as a third safe critical value. The calculated difference between the maximum mass flow rate $$\dot{m}_{line}^{max}$$

and the first safe critical value (maximum mass flow rate limit value)

$$\dot{m}_{line}^{limit}$$

is defined as $\Delta\dot{m}$, the calculated difference between the maximum hydrogen tank temperature $$T_{tank}^{max}$$

and the second safe critical value is defined as ΔT, and the calculated difference between the maximum hydrogen tank pressure $$P_{tank}^{max}$$

and the third safe critical value is defined as ΔP. It is illustrated that the dispenser controller 310 calculates a difference value by subtracting each of the calculated maximum mass flow rate, maximum hydrogen tank temperature, and maximum hydrogen tank pressure from a corresponding one of the safe critical values.

At this time, the dispenser controller 310 determines whether all of the difference values $\Delta\dot{m}$, ΔT, and ΔP are positive (+) values (S3600). When at least one of the difference values $\Delta\dot{m}$, $\Delta T$, and $\Delta P$ is not a positive (+) value, the dispenser controller 310 reduces the pressure ramp rate prr applied in step S4000 (S3620). In addition, the dispenser controller sets k to k+1 (k=k+1) (S3640), returns to step S3300, and repeats the process.

When all of the difference values al, $\Delta T$, and $\Delta P$ are positive values, on the other hand, the dispenser controller 310 determines whether at least one of $\Delta\dot{m}$, $\Delta T$, and $\Delta P$ is equal to or less than a predetermined value (S3700). When any one of $\Delta\dot{m}$, $\Delta T$, and $\Delta P$ is not equal to or less than the predetermined value, i.e. when all of the difference values $\Delta\dot{m}$, $\Delta T$, and $\Delta P$ are greater than predetermined values, the dispenser controller 310 increases the pressure ramp rate prr applied in step S4000 by a predefined value (S3720). Subsequently, the dispenser controller returns to steps S3640 and 3300 and repeats subsequent steps of the process.

When at least one of $\Delta\dot{m}$, $\Delta T$, and $\Delta P$ is equal to or less than the predetermined value, on the other hand, the dispenser controller determines the pressure ramp rate applied in step S4000 to be a new pressure ramp rate and maintains the pressure ramp rate (S3740). Subsequently, the dispenser controller 310 transmits information about the determined new pressure ramp rate to the hydrogen supply unit 330 (S3760). After transmission to the hydrogen supply unit 330, the hydrogen dispenser 300 continuously performs fueling to the hydrogen tank 110 of the CHSS 100 at the new pressure ramp rate $prr^{new}$. The dispenser controller 310 sets the value of N1 to the current time (S3780), returns to step S3100, and repeats the process.

After returning to step S3100, the dispenser controller 310 may receive information about the pressure $P_{ba}$ and temperature $T_{ba}$ of hydrogen supplied by the hydrogen dispenser 300 and the ambient temperature $T_{amb}$ measured in the vicinity of the hydrogen dispenser 300 from the hydrogen supply unit 330 in real time, and may perform subsequent steps of the process.

The pressure ramp rate when any one of the difference values is equal to or less than a corresponding one of prestored set values may be set as the optimum pressure ramp rate. Here, the prestored set values, which are allowable small values, may be set based on the results of research.

The dispenser controller 310 compares the calculated maximum mass flow rate $$\dot{m}_{line}^{max},$$

maximum hydrogen tank temperature $$T_{tank}^{max},$$

and maximum hydrogen tank pressure $$P_{tank}^{max}$$

with the safe critical values $$(\dot{m}_{line}^{limit},$$

85° C., and 87.5 MPa), respectively, to find the differences therebetween, i.e. a*, $\Delta T$, and $\Delta P$. At this time, the intention of the dispenser controller 310 is to maximally increase the initial pressure ramp rate within a range within which each of the maximum mass flow rate $$\dot{m}_{line}^{max},$$

the maximum hydrogen tank temperature $$T_{tank}^{max},$$

and the maximum hydrogen tank pressure $$P_{tank}^{max}$$

does not exceed a corresponding one of the safe critical values in order to shorten hydrogen fueling time. If even any one of the three values exceeds a corresponding one of the safe critical values, this may be a violation of laws. When all of $\Delta\dot{m}$, $\Delta T$, and $\Delta P$ are positive (+) values and at least one of $\Delta\dot{m}$, $\Delta T$, and $\Delta P$ is equal to or less than the predetermined value (e.g. an allowable small value (based on the results of research)), therefore, the pressure ramp rate applied at this time is set and regarded as the optimum pressure ramp rate prr.

A thermodynamic model used in hydrogen fueling simulation according to an embodiment of the present invention does not reflect heat transfer in the hydrogen transfer device 200. As a result, there occurs an error in the result of calculation of the temperature of hydrogen in the hydrogen tank 110. Since hydrogen fueling simulation is performed based on the pressure and temperature of the hydrogen tank 110 in the current state during hydrogen fueling, however, the error may be reduced if simulation time is sufficiently short. Consequently, hydrogen fueling simulation may be repeated during a residual fueling time until hydrogen fueling is finished.

The sequence of steps S3010 to S3780 described with reference to FIG. 3 is merely an example, and the present invention is not limited thereto. That is, the sequence of steps S3010 to S3780 may be changed, and some of the steps may be simultaneously executed or omitted.

First, the basic structure, definitions, and assumptions of a simple thermodynamic model will be briefly described.

Figure 4:
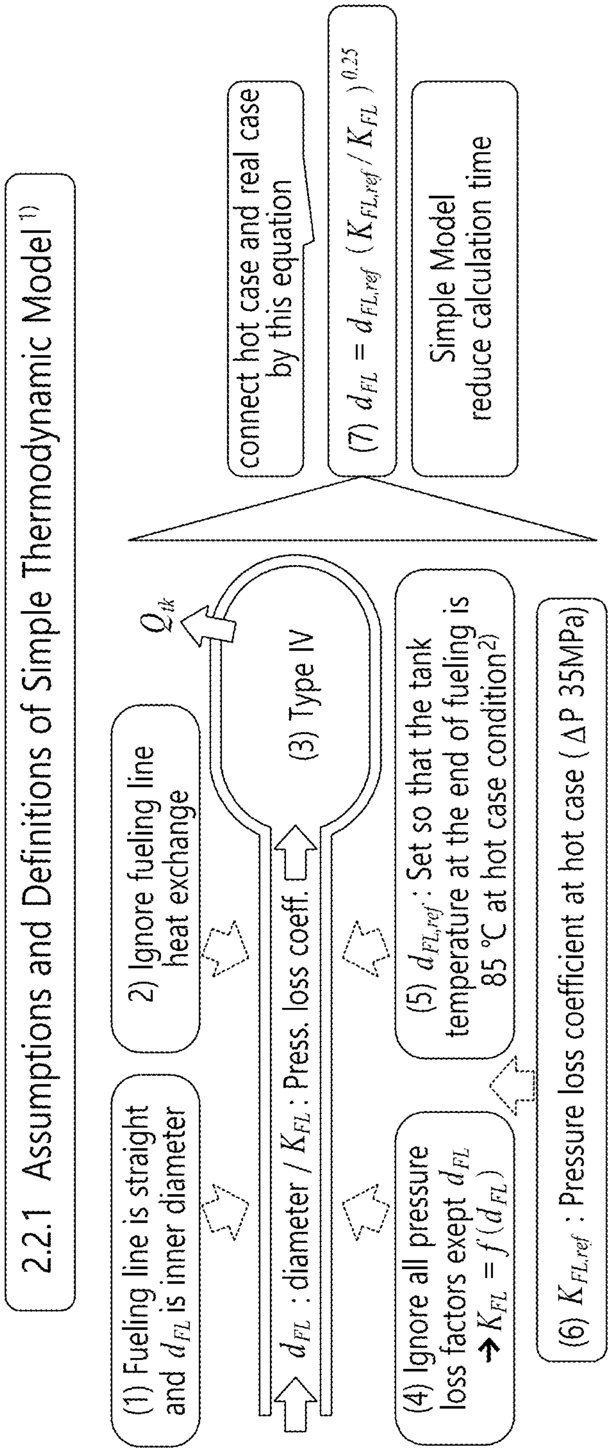
FIG. 4 is an illustrative view for explaining assumptions and definitions of a simple thermodynamic model (STM) to be applied in a real-time responding hydrogen fueling protocol according to an embodiment of the present invention.

FIG. 4 is an illustrative view for explaining assumptions and definitions of a simple thermodynamic model (STM) to be applied in a real-time responding hydrogen fueling protocol according to an embodiment of the present invention.

In the real-time responding hydrogen fueling protocol (RTP-HFP), the simple thermodynamic model uses two assumptions and three definitions. The reason that the two assumptions are introduced is that it is necessary to solve a problem in that it is impossible for the hydrogen dispenser to grasp the geometry of the CHSS to which hydrogen fueling is to be performed and to simplify the model, thereby increasing calculation speed.

Assumption 1: The fueling line is a single tube that is straight and has a uniform inner diameter value. $d_{FL}$ is the inner diameter value. An expression for calculating a pressure loss coefficient $K_{FL}$ of this tube has only the inner diameter thereof as a function ($K_{FL}$=f($d_{FL}$)). That is, all pressure drop factors excluding $d_{FL}$ are ignored. This may be a concept similar to that the pressure loss coefficient $K_{FL}$ is calculated on the assumption that the pressure drop of a hot case fueling line is 35 MPa in SAE J2610 (2020). $K_{FL}$=f ($d_{FL}$).

Assumption 2: No heat exchange occurs between a wall of the fueling line and gas flowing in the fueling line.

In addition, three definitions are introduced so as to be used in converting an STM in a reference state (in the state in which variables of the hot case are applied to the STM to fit the STM such that the STM has a fueling process simulation function equivalent to the thermodynamic model used in SAE J2610 (2020)) into an STM in a real state (in the state in which variables of the real case are substituted for the values of the hot case of the fitted STM in order to simulate the real case)

Definition 1: The hot case means a fueling condition in which the temperature of gas in the CHSS tank is the highest at the point in time when fueling is finished (identical to a hot case prescribed in SAE J2601).

Definition 2: The inner diameter of the fueling line according to definition 1 is defined as $d_{FL}$, and when an APRR applied to a TB-HFP of SAE J2601 is applied to the STM, at which a fueling line inner diameter value $d_{FL}$ at which the temperature of the CHSS tank is 85° C. is defined as a reference fueling line inner diameter $d_{FL,ref}$.

Definition 3: The pressure loss coefficient of the fueling line according to definition 1 is defined as $Kd_{FL}$, and the pressure loss coefficient of the fueling line calculated in the hot case condition (ΔP=35 MPa) is defined as $K_{FL,ref}$, which is called a reference pressure loss coefficient.

$d_{FL}$ according to assumption 1 and definition 1 is an imaginary fueling line inner diameter introduced to proportionally simulate thermodynamic characteristics of the fueling system. As can be seen from Mathematical Expression 3 related to FIG. 4, $d_{FL}$ in the RTR-HFP serves as a parameter that converts the STM of the reference state into the STM of the real state.

In the RTR-HFP, however, $d_{FL,ref}$ and $K_{FL,ref}$ are set in the hot case condition, and the pressure ramp rate prr is calculated in the real case condition. In the RTR-HFP, this is possible since real-time fueling process parameters (particularly $T_t$, which is the temperature of the hydrogen tank) are utilized in control. Efficiency of the fueling protocol may be improved based on such a structure of the RTR-HFP.

In the RTR-HFP, a lookup table used in the TB-HFP is used in order to set $d_{FL,ref}$. The lookup table of SAE J2601 applied to the TB-HFP is prepared for each tank capacity (2, 4, 7, and 10 kg), each temperature of supply gas (T20, T30, and T40), and each outside temperature (−40 to +50° C.). The reasons for using the lookup table of the TB-HFP are as follows:

1. It is possible to indirectly utilize a rigorous thermodynamic model used to develop SAE J2601, which has high public confidence.

2. A perfect table is provided for each tank capacity, each temperature of supply gas, and each outside temperature, whereby it is possible to derive $d_{FL,ref}$ capable of covering the entirety of the fueling process.

3. It is possible to easily secure compatibility between the table-based HFP (TB-HFP) of the RTR-HFP and SAE J2601 and an MC formula-based HFP (MC-HFP).

$d_{FL,ref}$ is set for each tank capacity and each outside temperature, as in the lookup table of the TB-HFP. Although $d_{FL,ref}$ is changed depending on the temperature of supply gas, the difference is not great and yields conservative results, whereby there is no problem in safety, and therefore the temperature of supply gas may be excluded from targets to be set. A method of finding $d_{FL,ref}$ is similar to a method of finding the APRR in the TB-HFP. In SAE J2601, iterative fueling process simulation is performed using the thermodynamic model applied to develop the fueling protocol to set the APRR such that the temperature and the SOC of the hydrogen tank at the point in time when fueling is finished are 85° C. and 95%, respectively. Iterative fueling process simulation is performed using the STM for the RTR-HFP with TB-HFP lookup table data (outside temperature and APRR) to set the APRR such that the temperature and the SOC of the hydrogen tank at the point in time when fueling is finished are 85° C. and 95%, respectively. When the temperature of the hydrogen tank derived by fueling process simulation after an APRR under a specific fueling condition and an arbitrary $d_{FL}$ value are input to the STM is greater than 85° C., a larger $d_{FL}$ value is input and simulation is performed again. When the temperature of the hydrogen tank is less than 85° C., a smaller $d_{FL}$ value is input and simulation is performed again. In this way, the $d_{FL}$ value is set. Examples of the $d_{FL}$ value set in the way described above are shown in Table 2 below. Table 2 illustrates $d_{FL,ref}$ values depending on the hydrogen tank capacities.

TABLE 2

| Tank Capacity (kg) | $d_{FL,ref}$ (m) |
|---|---|
| 2 | 0.000682 |
| 4 | 0.000985 |
| 7 | 0.00133 |
| 10 | 0.00149 |

Figure 5:
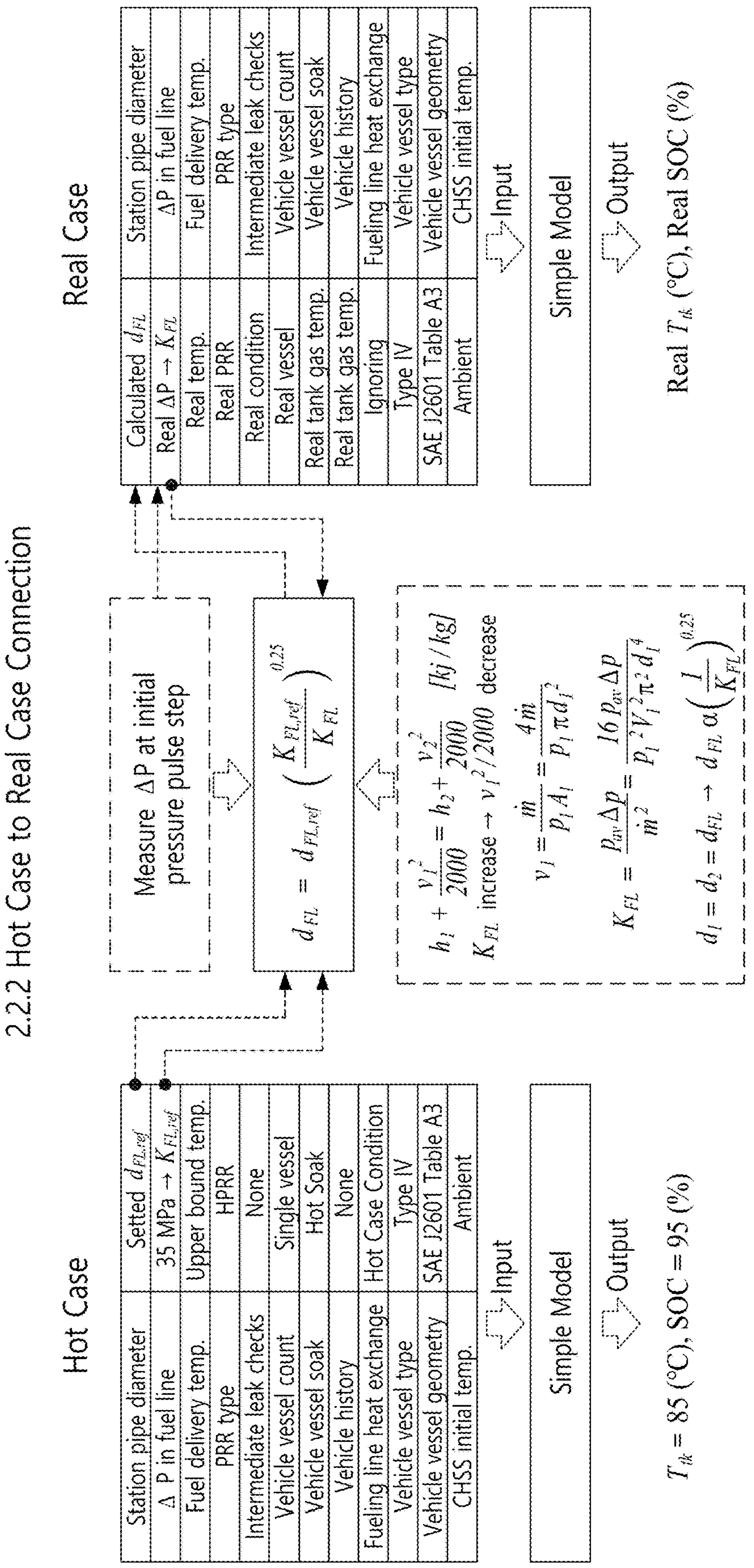
FIG. 5 is an illustrative view for explaining parameters for connecting a hot case to an STM of a real case.

FIG. 5 is an illustrative view for explaining parameters for connecting the hot case to the STM of the real case.

In the present invention, Mathematical Expression 3 below is proposed as an expression for connecting the hot case to the real case. When the hot case is connected to the real case according to Mathematical Expression 3 below and the simple thermodynamic model is applied, there is an effect in that it is possible to considerably reduce calculation time. The hot case may be applied to the real case according to a parametric expression, such as Mathematical Expression 3, based on expressions of Table 3 and the ΔP value measured in the initial pressure pulse step.

TABLE 3

$$h_1 + \frac{v_1^2}{2000} = h_2 + \frac{v_2^2}{2000}\ [\text{kJ/kg}]$$

$K_{FL}$ increase → $v_1^2/2000$ decrease $$v_1 = \frac{\dot{m}}{\rho_1 A_1} = \frac{4\dot{m}}{\rho_1 \pi d_1^2}$$

$$K_{FL} = \frac{\rho_{av}\Delta p}{\dot{m}^2} = \frac{16\rho_{av}\Delta p}{\rho_1^2 V_1^2 \pi^2 d_1^4}$$

$$d_1 = d_2 = d_{FL} \rightarrow d_{FL} \propto \left(\frac{1}{K_{FL}}\right)^{0.25}$$

$$d_{FL}=d_{FL,ref}(K_{FL,ref}/K_{FL})^{0.25} \qquad \text{[Mathematical Expression 3]}$$

0.25 indicated as an index value or other values are not excluded from Mathematical Expression 3 above. In Mathematical Expression 3, $d_{FL}$ in the RTR-HFP serves as a parameter that converts the STM of the reference state into the STM of the real state.

The simple thermodynamic model (STM) is an engine of the RTR-HFP designed to simulate the hydrogen fueling process through application of the assumptions and definitions described above. In the RTR-HFP, the pressure ramp rate PRR applied to the fueling process is calculated using this model in real time.

The basic function of the STM is to calculate the mass flow rate of compressed hydrogen introduced into the hydrogen tank 110 and the pressure and the temperature of compressed hydrogen in the CHSS 100. In order to perform this function, the expression for calculating the pressure drop of the fueling line, the expression for calculating the mass flow rate of the fueling line, the expression for calculating the enthalpy of gas introduced into the CHSS 100, and the expression for calculating the temperature and the pressure of gas in the CHSS 100 are necessary.

The hot case may be connected to the real case based on Mathematical Expression 3 above. the pressure loss coefficient $K_{FL}$ in the real case may be calculated based on the measured ΔP, and $d_{FL}$ in the real case may be calculated based on the calculated $K_{FL}$ according to Mathematical Expression 3 above.

Values of the real case shown in the right side of FIG. 5 are applied to a predetermined thermodynamic model (e.g. simple thermodynamic model) as input values to calculate output values. There are the real hydrogen tank temperature and the real SOC value as the values calculated at this time.

As shown in FIG. 5, when the STM inputs parameters of the hot case, a temperature Ta of the hydrogen tank 110 of 85° C. and an SOC of the hydrogen tank of 95% are calculated, and when the STM inputs parameters of the real case, a temperature Ta of the hydrogen tank 110 of the real case and an SOC of the hydrogen tank of the real case of 95% are calculated. Since dFL is an imaginary parameter, however, it is impossible to measure this parameter in an actual process. A plurality of assumptions and definitions have been set to calculate the dFL value, which is an imaginary parameter value, from a parameter that can be actually measured.

When pressure drop due to friction in the fueling line is ignored in addition to assumption 2 above, the total amount of energy $E_t$ introduced from the fueling line to the tank may be calculated according to Mathematical Expression 4 below.

[Mathematical Expression 4]

$$E_{ti} = h_{ba} + \left(\frac{v_{ba}^2}{2}\right) = h_{ti} + \left(\frac{v_{ti}^2}{2}\right)$$

According to this expression of $E_{ti}$, $E_{ti}$ may be found by $h_{ba}$ having the temperature and the pressure of hydrogen gas that enters the inlet of the fueling line as functions and $v_{ba}^2/2$ having the gas flow velocity as a function. When assumption 1 above is applied thereto, a change in pressure drop value of the fueling line is represented as a change in flow velocity of the hydrogen gas that enters the inlet of the fueling line if the temperature and the pressure of the gas that enters the inlet of the fueling line are uniform. In addition, $v_{ba}$ and $K_{FL}$ may be represented by Mathematical Expression 5 below based on the definitions thereof, and finally a relational expression of $d_{FL}$ may be induced.

[Mathematical Expression 5]

$$v_{ba} = \frac{\dot{m}}{\rho_{FL} A_{ba}} = \frac{4\dot{m}}{\rho_{FL}\pi d_{ba}^2}$$

-continued $$K_{FL} = \frac{\rho_{FL}\Delta p}{\dot{m}^2} = \frac{16\rho_{FL}\Delta p}{\rho_{FL^2} v_{ba}^2 \pi^2 d_{FL}^4}$$

$$d_{FL} \propto \left(\frac{1}{K_{FL}}\right)^{0.25}$$

$d_{FL,ref}$ and $K_{FL,ref}$ may be applied to the above expression to induce Mathematical Expression 3 above capable of calculating dFL of the real case.

As a result, $K_{FL,ref}$ of the STM in the reference state is changed to $K_{FL}$ measured by the hydrogen dispenser 300 in the step before fueling commencement (initial pressure pulse step), and $d_{FL,ref}$ is changed to $d_{FL}$ calculated by Mathematical Expression 3 above, whereby the STM in the reference state is changed to the STM in the real state, and therefore it is possible to simulate the real case.

In the present invention, the two assumptions are used to simplify the structure of the STM. In order to confirm feasibility of these assumptions, it is necessary to determine the influence thereof on performance of the RTR-HFP. The most important goal of the STM is to calculate the temperature of the hydrogen tank 110. Mathematical Expression 6 is an expression for calculating the temperature of hydrogen gas in the hydrogen tank 110.

[Mathematical Expression 6]

$$T_{tk}^t = \frac{\left(h_{sg,ti}^t \dot{m}_{ti}^t - Q_{tk}^t\right)\Delta t + \left(Cv_{tk}^{t-1} T_{tk}^{t-1} m_{tk}^{t-1}\right)}{Cv_{tk}^{t-1}\left(m_{tk}^{t-1} + \dot{m}_{ti}^t \Delta t\right)}$$

In order to confirm feasibility of the assumptions, the functional relationship of Mathematical Expression 6, which is an expression for calculating the temperature of the hydrogen tank 110, will be described. Mathematical Expression 7 below shows the functional relationship of the expression for calculating the temperature of the hydrogen tank 110.

$$T_{tk}=f(\dot{m}_{ti},h_{sg,ti},Cv_{tk})Q_{tk})$$ [Mathematical Expression 7]

That is, the temperature of hydrogen gas in the hydrogen tank 110 is calculated by a mathematical expression having $h_{sg,ti}$, $\dot{m}_{ti}$, $Cv_{tk}$, and $Q_{tk}$ as functions, such as Mathematical Expression 7. Here, $Cv_{tk}$ and may be excluded from targets to review since these variables have the temperature $T_{tk}$ of the hydrogen tank 110 and the pressure Pa of the hydrogen tank 110 as functions. An expression for calculating $h_{sg,ti}$ in the state before assumption 2 above is applied may be represented as Mathematical Expression 8 below.

[Mathematical Expression 8]

$$h_{sg,ti} = h_{st,ba} + \frac{v_{ba}^2}{2000} + \frac{Q_{FL}}{\dot{m}}$$

When analyzing Mathematical Expression 1 above, Mathematical Expression 7 above, and Mathematical Expression 8 above, it can be seen that the functional relationship of the expression for calculating the temperature of the hydrogen tank 110 is represented as Mathematical Expression 9 below.

$$T_{tk}=f(P_{ba},T_{ba},P_{ti},T_{ti},K_{FL},d_{FL},Q_{FL})$$ [Mathematical Expression 9]

The case in which Mathematical Expression 9 above is applied to SAE J2601 again and the case in which Mathematical Expression 9 above is applied to the STM in the reference state (to which assumption 2 is applied) may be represented as the following mathematical expressions. That is, Mathematical Expression 10 represents the functional relationship of the temperature of the hydrogen tank 110 in the case in which Mathematical Expression 9 above is applied to SAE J2601 again, and Mathematical Expression 11 represents the functional relationship of the temperature of the hydrogen tank 110 in the case in which Mathematical Expression 9 above is applied to the STM in the reference state (to which assumption 2 is applied).

$$T_{tk}=f(P_{ba},T_{ba,hot},P_{ti},T_{ti},K_{FL,hot},d_{FL,hot},Q_{FL,hot})$$ [Mathematical Expression 10]

$$T_{tk}=f(P_{ba},T_{ba,hot},P_{ti},T_{ti},K_{FL,hot},d_{FL,ref})$$ [Mathematical Expression 11]

It can be seen from comparison between Mathematical Expression 10 above and Mathematical Expression 11 above that a relationship like Mathematical Expression 12 below is established.

$$d_{FL,ref}=f(d_{FL,hot},Q_{FL,hot})$$

In the TB-HFP, the variable of the hot case condition is input at $d_{FL,hot}$=5 (mm) to set the APRR such that simulation results are 85° C. and an SOC of 95%. In the STM, on the other hand, the variable of the hot case condition and the APRR are input to set $d_{FL,hot}$ such that simulation results are 85° C. and an SOC of 95%. In the RTR-HFP, in which the STM is loaded, Mathematical Expression 3 above, which is a proportional expression, is calculated/applied using actually measured $\Delta P_{real}$ such that the STM can simulate the real case. When the real variable is input hereto and simulation is performed, the temperature and the SOC of the hydrogen tank 110 for the real case may be calculated. However, since $d_{FL,ref}$ of the STM is set using the lookup table used in the TB-HFP, as confirmed from Mathematical Expression 12 above, the value of $d_{FL,ref}$ includes not only the value of $d_{FL,hot}$ but also the value of $Q_{FL,hot}$. As a result, when the value of $d_{FL,ref}$ set in this way is applied to the STM and the RTR-HFP is driven, expected errors may be summarized as follows:

Since the temperature value $T_{tk}$ of the hydrogen tank 110 calculated through simulation by the STM will be higher than an actual temperature value, there is a possibility of the derived prr value being set to be less than an appropriate level, whereby elapsed time for fueling is delayed. When the prr is derived in the next step, however, simulation is performed using the measured actual temperature value $T_{tk}$ of the hydrogen tank 110 without using the temperature value $T_{tk}$ of the hydrogen tank 110 calculated by simulation, whereby the effect thereby may be reduced. As a result, safety in controlling the fueling process of the RTR-HFP is more effectively achieved due to the two assumptions introduced in the present invention.

$d_{FL}$ (or $d_{FLE}$) calculated as in Mathematical Expression 3 above is used as an input value of the simple thermodynamic model (STM) so as to be applied to hydrogen fueling control of the RTR-HFP.

Figure 6:
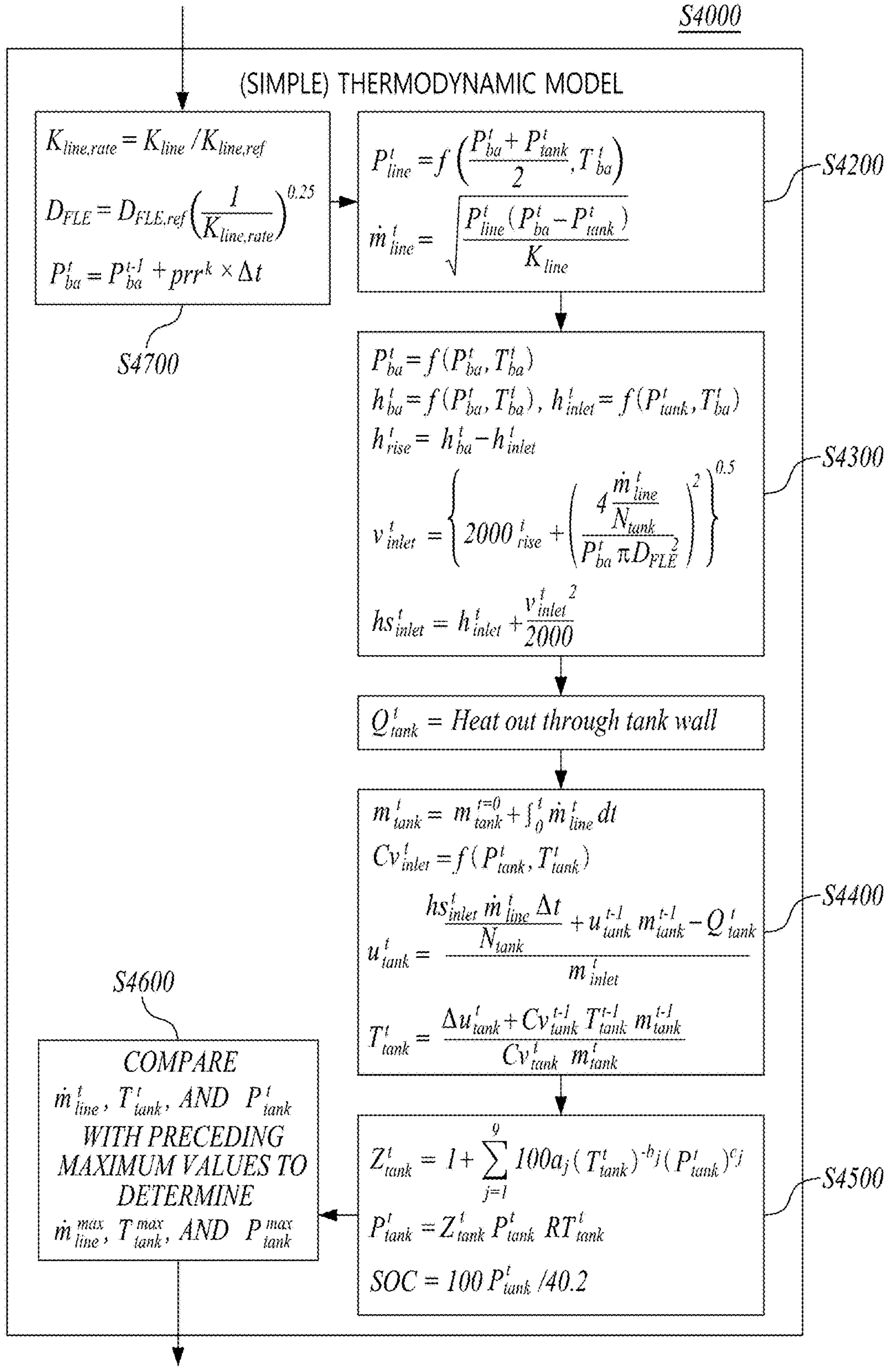
FIG. 6 is a flowchart showing the operation process of the thermodynamic model to be applied in the real-time responding hydrogen fueling protocol according to the embodiment of the present invention.

FIG. 6 is a flowchart showing the operation process of the thermodynamic model to be applied in the real-time responding hydrogen fueling protocol according to the embodiment of the present invention.

The simple thermodynamic model according to the embodiment of the present invention functions to calculate the mass flow rate $$\dot{m}^{t}_{line},$$

the temperature $$T^{t}_{tank}$$

of the hydrogen tank 110, the pressure $$P^{t}_{tank}$$

of the hydrogen tank 110, and the state of charge (SOC) of the hydrogen tank using an initial state value and data received from the IR receiver 260 and the hydrogen supply unit 330 and to determine the maximum mass flow rate $$\dot{m}^{max}_{line},$$

the maximum hydrogen tank temperature $$T^{max}_{tank}$$

and the maximum hydrogen tank pressure $$P^{max}_{tank}$$

through comparison with the preceding maximum values. Step S4000 of FIG. 3 will be described in detail with reference to FIG. 6.

Step S4100

A step of fitting the simple thermodynamic model will be described. The goal of the simple thermodynamic model is to rapidly search for the maximum pressure ramp rate prr in real time within a range in which the temperature, the pressure, and the mass flow rate of gas in the hydrogen tank do not exceed predetermined critical values. In the simple thermodynamic model, therefore, a structural variable value or a thermodynamic variable value impossible for the hydrogen dispenser to check must be excluded from targets to be reflected, and a process requiring lots of time for calculation must be simplified. Nevertheless, the simple thermodynamic model must well simulate characteristics of an actual hydrogen fueling process.

In order to satisfy such requirements, fitting is necessary. Here, the inner diameter of the hydrogen fueling line is used as a fitting factor. On the assumption that all influence factors affecting pressure drop of the fueling line are included in the fitted inner diameter of the hydrogen fueling line, the term "equivalent inner diameter" is used. When the structural variable values and the thermodynamic variable values of the CHSS, the hydrogen dispenser, and the data communication mobile device corresponding to a specific condition are input to simulate fueling, fitting is performed using a method of adjusting the equivalent inner diameter $D_{FLE}$ of the fueling line such that the simulation result value equal to the actual fueling result is obtained ($D_{FLE}=D_{FL}$).

Here, the specific condition may be the hot case suggested in SAE J2601 (2020). In this case, fitting may be performed for each hydrogen tank capacity (e.g. 2 kg, 4 kg, 7 kg, or 10 kg) and each atmospheric temperature. The fitted result value is referred to as a reference equivalent inner diameter $D_{FLE,ref}$. The reference equivalent inner diameter $D_{FLE,ref}$ may be calculated based on Mathematical Expression 13 below (S4100).

$$D_{FLE} = D_{FLE,ref}\left(\frac{1}{K_{line,rate}}\right)^{0.25}$$ [Mathematical Expression 13]

Here, $K_{line,rate}=K_{line}/K_{line,ref}$.

The dispenser controller 310 may set hydrogen supply pressure of the hydrogen dispenser 300. This step is a step of setting the pressure of hydrogen supplied from the hydrogen dispenser 300. The dispenser controller 310 may calculate the hydrogen supply pressure value of the hydrogen dispenser 300 based on the hydrogen supply pressure $$P_{ba}^{t-1}$$

in the preceding time step −Δt (i.e. t−1), the pressure ramp rate $prr^k$ in the current step, and the hydrogen fueling simulation time period Δt. As an example, calculation may be performed based on Mathematical Expression 14 below.

$$P_{ba}^{t} = P_{ba}^{t-1} + (prr^k \times \Delta t)$$ [Mathematical Expression 14]

Here, $$P_{ba}^{t}$$

is the hydrogen supply pressure value, which is the supply pressure of hydrogen supplied through the fueling line at time t, $$P_{ba}^{t-1}$$

is the hydrogen supply pressure in the preceding time step −Δt (i.e. t−1), $prr^k$ is the pressure ramp rate in the current step, and Δt is the hydrogen fueling simulation time period or the time interval at which the simple thermodynamic model performs calculation once.

Step S4200

Step 4200 is a step of calculating the hydrogen density value and the mass flow rate value in the hydrogen transfer device 200 (or the fueling line). The dispenser controller 310 may calculate the hydrogen density value $$\rho_{line}^{t}$$

in the hydrogen transfer device 200 based on the temperature value $$T_{ba}^{t}$$

of hydrogen supplied from the hydrogen dispenser 300, the pressure value $$P_{ba}^{t}$$

of hydrogen supplied from the hydrogen dispenser 300 calculated in S4100, and the pressure value $$P_{tank}^{t}$$

of the hydrogen tank. As an example, calculation may be performed based on Mathematical Expression 15 below.

$$\rho_{line}^{t} = f\left(\frac{P_{ba}^{t} + P_{tank}^{f}}{2},\ T_{ba}^{t}\right)$$ [Mathematical Expression 15]

The dispenser controller 310 may calculate the mass flow rate $$\dot{m}_{line}^{t},$$

which is the hydrogen flow rate of the hydrogen transfer device 200, using the equivalent inner diameter $D_{FLE}$ and the hydrogen supply pressure value $$P_{ba}^{t}$$

calculated in S4100 (S4300). The mass flow rate $$\dot{m}_{line}^{t}$$

of the hydrogen transfer device 200 may be calculated based on the hydrogen density value $$\rho_{line}^{t}$$

in the hydrogen transfer device 200 calculated based on Mathematical Expression 15, the pressure $$P_{ba}^{t}$$

of hydrogen supplied by the hydrogen dispenser 300, the pressure $$P_{tank}^{t}$$

of the hydrogen tank 110, and the pressure loss coefficient $K_{line}$ of the hydrogen transfer device 200. As an example, calculation may be performed based on Mathematical Expression 16 below.

[Mathematical Expression 16]

$$\dot{m}_{line}^{t} = \sqrt{\frac{\rho_{line}^{t}(P_{ba}^{t} - P_{tank}^{t})}{K_{line}}}$$

As the difference between the pressure $$P_{ba}^{t}$$

of hydrogen supplied by the hydrogen dispenser 300 and the pressure value $$P_{tank}^{t}$$

increases and as the pressure loss coefficient $K_{line}$ decreases, the mass flow rate $$\dot{m}_{line}^{t}$$

of the hydrogen transfer device 200 increases.

Step S4300

Step S4300 is a step of the dispenser controller 310 calculating the density value and enthalpy of hydrogen supplied from the hydrogen supply unit 330, the inflow velocity of hydrogen introduced into the hydrogen tank 110, and stagnation enthalpy of hydrogen introduced into the hydrogen tank 110.

The dispenser controller 310 may calculate stagnation enthalpy of hydrogen introduced into the hydrogen tank 110 (S4300). S4300 is a step of finding stagnation enthalpy $$hs_{inlet}^{t}$$

of hydrogen introduced into the hydrogen tank 110. In order to find the stagnation enthalpy $$hs_{inlet}^{t},$$

it is necessary to perform calculation based on Mathematical Expression 8.

The dispenser controller 310 may calculate the density value $$\rho_{ba}^{t}$$

of hydrogen supplied by the hydrogen supply unit 330 through the fueling line and the enthalpy $$h_{ba}^{t}$$

of hydrogen supplied by the hydrogen supply unit 330 through the fueling line based on Mathematical Expression 17 below.

[Mathematical Expression 17]

$$\rho_{ba}^{t} = f(P_{ba}^{t}, T_{ba}^{t})$$

$$h_{ba}^{t} = f(P_{ba}^{t}, T_{ba}^{t}),\ h_{inlet}^{t} = f(P_{tank}^{t}, T_{ba}^{t})$$

$$h_{rise}^{t} = h_{ba}^{t} - h_{inlet}^{t}$$

$$v_{inlet}^{t} = \left\{2000h_{rise}^{t} + \left(\frac{4\frac{\dot{m}_{line}^{t}}{N_{tank}}}{\rho_{ba}^{t}\pi D_{FLE}^{2}}\right)^{2}\right\}^{0.5}$$

The stagnation enthalpy $$hs_{inlet}^{t}$$

of hydrogen introduced into the hydrogen tank may be calculated based on the enthalpy $$h_{ba}^{t}$$

of hydrogen supplied by the hydrogen supply unit 330 through the fueling line, the mass flow rate $$\dot{m}_{line}^{t}$$

introduced into the hydrogen tank 110, the number $N_{tank}$ of the hydrogen tanks 110 connected to each other in parallel, the equivalent inner diameter $D_{FLE}$ of the fueling line, and the density value $$\rho_{ba}^{t}$$

of hydrogen supplied by the hydrogen supply unit 330 through the fueling line.

The dispenser controller 310 may calculate stagnation enthalpy of hydrogen introduced into the hydrogen tank 110 based on the value calculated in Mathematical Expression 8 above. As an example, the stagnation enthalpy of hydrogen may be calculated based on Mathematical Expression 18 below.

[Mathematical Expression 18]

$$hs_{inlet}^{t} = h_{inlet}^{t} + \frac{{v_{inlet}^{t}}^{2}}{2000}$$

When the number $N_{tank}$ of the hydrogen tanks 110 connected to each other in parallel is increased, the flow velocity of hydrogen introduced into each hydrogen tank 110 decreases, whereby the stagnation enthalpy value $$hs_{inlet}^{t}$$

decreases. When the equivalent inner diameter $D_{FLE}$ of the fueling line is decreased, the flow velocity of hydrogen introduced into the hydrogen tank 110 increases, whereby the stagnation enthalpy value increases. Referring to Mathematical Expression 18, it can be seen that the stagnation enthalpy value $$hs^t_{inlet}$$

increased in proportion to the square of the velocity of the introduced hydrogen.

$$Q^t_{tank}$$

indicates heat transfer energy of the vehicle hydrogen tank at time t.

Step S4400

Step S4400 is a step of the dispenser controller 310 calculating the hydrogen mass $$m^t_{tank}$$

of the hydrogen tank 110, the constant volume heat capacity value $$Cv^t_{inlet}$$

of hydrogen introduced into the hydrogen tank 110, the internal energy $$u^t_{tank}$$

of the hydrogen tank 110, and the temperature $$T^t_{tank}$$

of the hydrogen tank 110.

The dispenser controller 310 may calculate the temperature $$T^t_{tank}$$

of the hydrogen tank 110. The temperature $$T^t_{tank}$$

of the hydrogen tank 110 may be found by substituting the internal energy change value $$\Delta u^t_{tank}$$

of the hydrogen tank 110 and the constant volume heat capacity value $$Cv^t_{tank}$$

of hydrogen in the hydrogen tank 110 into Mathematical Expression 10. To this end, the constant volume heat capacity value $$Cv^t_{tank},$$

the temperature $$T^t_{tank}$$

of the hydrogen tank 110, and the pressure $$P^t_{tank}$$

of the hydrogen tank 110 must be determined.

In an embodiment of the present invention, however, the constant volume heat capacity value $$Cv^t_{tank}$$

tank must be calculated in the step before the temperature $$T^t_{tank}$$

of the hydrogen tank 110 and the pressure $$P^t_{tank}$$

of the hydrogen tank 110 are calculated in sequence of calculation, the temperature $$T^{t-1}_{tank}$$

of the hydrogen tank 110 and the pressure $$P^{t-1}_{tank}$$

of the hydrogen tank 110 are applied instead of the temperature $$T^t_{tank}$$

of the hydrogen tank 110 and the pressure $$P^t_{tank}$$

of the hydrogen tank 110, and calculation is performed. As a result, the temperature $$T^t_{tank}$$

of the hydrogen tank 110 is higher than an actual temperature; however, this yields conservative results, whereby there is no problem in safety.

The dispenser controller 310 may calculate the temperature $$T^t_{tank}$$

of the hydrogen tank 110 based on Mathematical Expression 19 below.

$$T^t_{tank} = \frac{\Delta u^t_{tank} + Cv^{t-1}_{tank} T^{t-1}_{tank} m^{t-1}_{tank}}{Cv^t_{tank} m^t_{tank}} \quad \text{[Mathematical Expression 19]}$$

Step S4500

The dispenser controller 310 may calculate the pressure of the hydrogen tank 110 and the state of charge (SOC) of the hydrogen tank corresponding to the degree of hydrogen fueling. Compressed hydrogen is compressed to several ten MPa in order to improve storage efficiency, and therefore it is impossible to apply the equation of state of ideal gas to high-pressure compressed hydrogen. In order to find the pressure $$P^t_{tank}$$

of the hydrogen tank 110, it is necessary to know the compressibility factor of hydrogen, and in order to calculate correct pressure of hydrogen having a characteristic in that the temperature of the hydrogen increases due to the Joule-Thomson effect at the time of adiabatic expansion, it is necessary to calculate the compressibility factor using the equation of state having such a characteristic reflected therein.

In an embodiment of the present invention, Mathematical Expression 20 to Mathematical Expression 22 specifically developed as the equation of state of hydrogen are used. The pressure of $$P^t_{tank}$$

and the state of charge (SOC) of the hydrogen tank 110 may be found according to Mathematical Expression 20 to Mathematical Expression 22.

$$Z^t_{tank} = 1 + \sum_{j=1}^{9} 100 a_j (T^t_{tank})^{-b_j} (P^t_{tank})^{c_j} \quad \text{[Mathematical Expression 20]}$$

Mathematical Expression 20 corresponds to the compressibility factor of the hydrogen tank 110 at time t.

$$P^t_{tank} = Z^t_{tank} \rho^t_{tank} R T^t_{tank} \quad \text{[Mathematical Expression 21]}$$

Here, R is the universal gas constant, the value of which is defined in Table 1. Mathematical Expression 21 corresponds to the pressure value of the hydrogen tank 110 at time t.

$$SOC = 100 \rho^t_{tank} / 40.2 \quad \text{[Mathematical Expression 22]}$$

Here, $$\rho^t_{tank}$$

indicates the density of gas in the hydrogen tank 110, and $$\rho^t_{tank}$$

may be calculated based on Mathematical Expression 20 and Mathematical Expression 21 above.

Step S4600

The dispenser controller 310 may determine the maximum pressure and the maximum temperature of the hydrogen tank 110 and the maximum mass flow rate corresponding to the maximum hydrogen flow rate of the hydrogen transfer device 200. The dispenser controller compares the mass flow rate $$\dot{m}^t_{line}$$

of the hydrogen transfer device 200, the pressure $$P^t_{tank}$$

of the hydrogen tank 110, and the temperature $$T^t_{tank}$$

of the hydrogen tank 110 calculated in the previous steps with the preceding maximum values, and determines larger values to be the maximum mass flow rate $$\dot{m}^{max}_{line},$$

the maximum hydrogen tank temperature $$T_{tank}^{max},$$

and the maximum hydrogen tank pressure $$P_{tank}^{max}$$

(S4600).

In the hydrogen fueling safety standards, each of the above values is restricted so as not to exceed a safe critical value during fueling as well as at the point in time at which the hydrogen fueling process is finished. In an embodiment of the present invention, therefore, the maximum mass flow rate $$\dot{m}_{line}^{max},$$

the maximum hydrogen tank temperature $$T_{tank}^{max},$$

and the maximum hydrogen tank pressure $$P_{tank}^{max}$$

are set as variables to be controlled.

The sequence of steps S4100 to S4600 is merely an example, and the present invention is not limited thereto. That is, the sequence of S4100 to S4600 may be changed, and some of the steps may be simultaneously executed or omitted.

Figure 7:
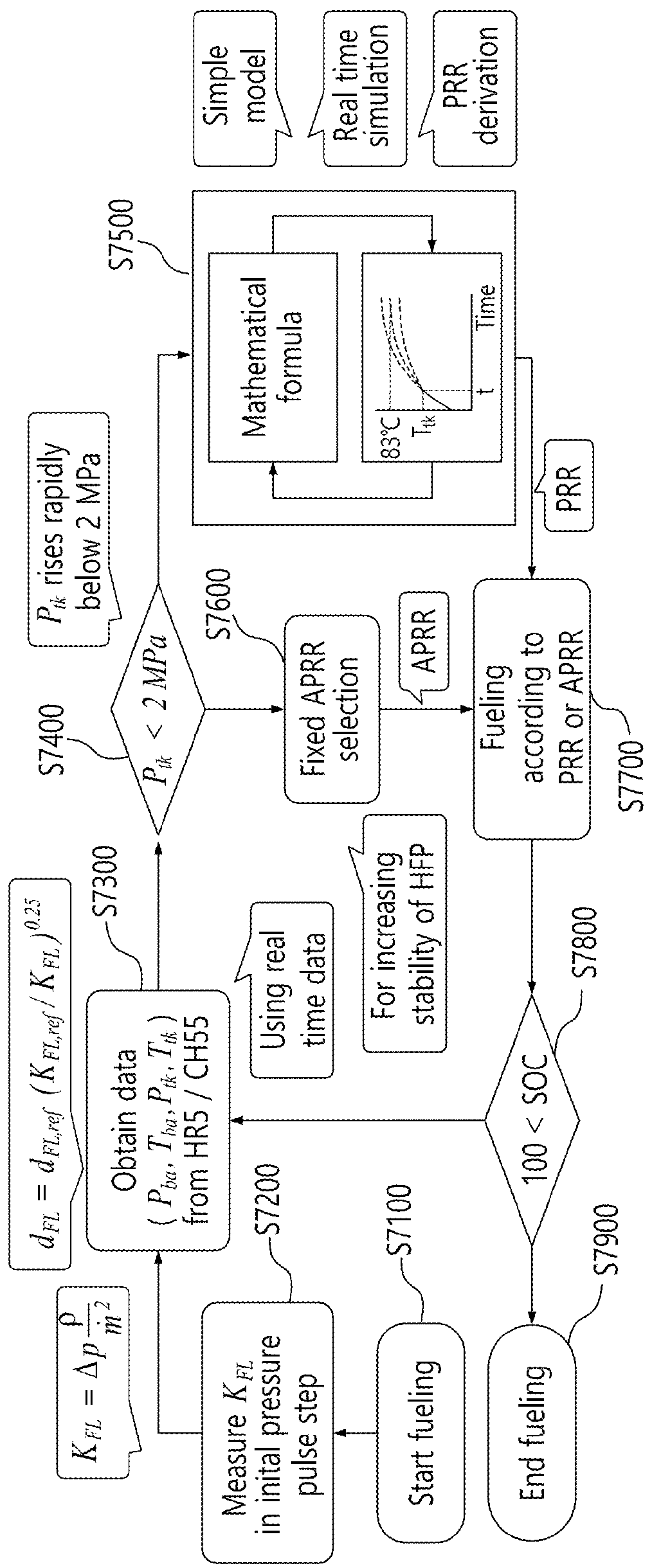
FIG. 7 is an illustrative view for explaining a process of calculating and applying a pressure ramp rate (PRR) in real time in accordance with an embodiment of the present invention.

FIG. 7 is an illustrative view for explaining a process of calculating and applying the pressure ramp rate PRR in real time in accordance with an embodiment of the present invention.

Referring to FIG. 7, the hydrogen dispenser 300 starts fueling (S7100). The hydrogen dispenser 300 measures or calculates the pressure loss coefficient $K_{FL}$ in the initial pressure pulse step at the fueling line. As an example, the pressure loss coefficient value is a value calculated through measurement after a small quantity of hydrogen gas is introduced when hydrogen fueling is commenced. The hydrogen density may be calculated using temperature and pressure, the flow velocity at which hydrogen is introduced may be measured, and the hydrogen dispenser 300 may calculate the pressure loss coefficient $K_{FL}$ according to Mathematical Expression 1 above.

The hydrogen dispenser 300 induces the value of $d_{FL}$ applied to the real case from the calculated pressure loss coefficient $K_{FL}$ using Mathematical Expression 3 above. The dispenser controller 310 may receive the values of $K_{FL}$ and $d_{FL}$ calculated in the initial pressure pulse step at the fueling line from the hydrogen supply unit 330 (S7200). The dispenser controller 310 applies the received pressure loss coefficient value $K_{FL}$ and fueling line inner diameter value $d_{FL}$ to real-time hydrogen fueling in the real case. The calculated fueling line inner diameter value $d_{FL}$ may be replicated or copied as the inner diameter of the hydrogen supply hose 230 in the real case.

The dispenser controller 310 may receive information about the pressure $P_{ba}$ and the temperature $T_{ba}$ of hydrogen supplied by the hydrogen dispenser 300 from the hydrogen supply unit 330 to obtain initial information, and may receive the pressure $P_{tk}$ and the temperature $T_{tk}$ of the hydrogen tank 110 collected from the temperature sensor and the pressure sensor of the CHSS 100 to obtain initial information (S7300). In S7300, real-time data are used.

The dispenser controller 310 determines whether the pressure $P_{tk}$ of the hydrogen tank 110 is less than a predetermined value (e.g. 2 MPa) (S7400). The dispenser controller 310 may determine whether to apply a predetermined thermodynamic model (e.g. a simple thermodynamic model) based on whether the pressure $P_{tk}$ of the hydrogen tank 110 is less than a predetermined value (e.g. 2 MPa). When the pressure $P_{tk}$ of the hydrogen tank 110 is less than the predetermined value (value selected through iterative simulation in consideration of both a characteristic in which driving stability of the thermodynamic model is lost when the value of the hydrogen tank 110 is too high and a characteristic in which the fueling velocity is reduced when the value thereof is too low) (e.g. 2 MPa as absolute pressure), much more time is taken in applying the simple thermodynamic model to calculate the PRR. At this time, therefore, the simple thermodynamic model is not applied, and the fixed APRR is selected (S7600). The dispenser controller 310 may perform control such that the dispenser 300 performs fueling according to the fixed APRR (S7700). When the pressure $P_{tk}$ of the hydrogen tank 110 is not less than the predetermined value (e.g. 2 MPa as absolute pressure), on the other hand, the simple thermodynamic model is applied to calculate the PRR in real time (S7500). The dispenser controller 310 may perform control such that the dispenser 300 performs fueling according to the calculated PRR (S7700).

Subsequently, the dispenser controller 310 determines whether the state of charge is greater than 100 (S7800). When the state of charge (SOC) is greater than 100, the dispenser controller finishes fueling (S7900). When the state of charge (SOC) is equal to or less than 100, on the other hand, the dispenser controller returns to step S7300 and repeatedly performs subsequent steps of the process.

Subsequently, the dispenser controller 310 determines whether the state of charge is greater than 100 (S7800). When the state of charge (SOC) is greater than 100, the dispenser controller finishes fueling (S7900). When the state of charge (SOC) is equal to or less than 100, on the other hand, the dispenser controller returns to step S7300 and repeatedly performs subsequent steps of the process.

As described above, in the real-time responding hydrogen fueling protocol, a determination may be made whether to select the predefined fixed APRR value or to apply the predetermined thermodynamic model in order to calculate or induce the PRR based on whether the pressure $P_{tk}$ of the hydrogen tank 110 is less than the predetermined value (e.g. 2 MPa). That is, in order to secure stability of the real-time responding hydrogen fueling protocol, when the pressure $P_{tk}$ of the hydrogen tank 110 is less than the predetermined value (e.g. 2 MPa), the prr calculated in real time is not applied but the predefined (calculated) fixed APRR (or PRR) value is selected and fueling is performed.

Even in S3230 of FIG. 3, the dispenser controller 310 determines whether the pressure $P_{tk}$ of the hydrogen tank 110 is less than a predetermined value (e.g. 5.1 MPa), and the value obtained by dividing the fixed prr by the number of the hydrogen tanks is determined as $prr^{new}$. This $prr^{new}$ may be the fixed APRR selected in FIG. 6.

A technique of limiting the prr change rate is also used in order to solve a problem in that the prr calculated in real time is discontinuously changed or fluctuated. Also, in order to prevent overfueling due to a control error, a technique of applying the upper bound of the calculated prr according to the residual fueling time may also be used. As a result, when the initial pressure of the CHSS tank is 0 MPa (in an existing HFP, fueling is possible only when the initial pressure is 0.5 MPa or more), as shown in FIG. 5, and even when the supply gas temperature is 30° C. and the outside temperature is 30° C., as shown in FIG. 6, fueling control is smoothly performed without precooling.

In the hydrogen fueling protocol, the object of which is safety control, safety performance of the logic configured such that the CHSS 100 is damaged by high temperature, high pressure, and excessive mass flow velocity must be guaranteed, and integrity of the control system must also be guaranteed. In addition, since the RTR-HFP uses a thermodynamic variable collected in real time in fueling process safety control, robustness of the sensor configured to measure the variable against an error must be securely guaranteed.

The real-time responding hydrogen fueling method according to the embodiment of the present invention described above has the following effects distinguished from an existing hydrogen fueling method prescribed in SAE J2601.

First, the existing hydrogen fueling prescribed in SAE J2601 is possible only in the state in which the hydrogen tank 110 is precooled (e.g. to −17.5° C.). If not, the temperature of the hydrogen tank rises sharply, whereby the temperature of the hydrogen tank rapidly reaches 85° C. In the hydrogen fueling method according to the present invention, however, hydrogen fueling is possible even though the temperature of the hydrogen tank 110 is maintained at about 30° C.

Also, in the hydrogen fueling method according to the present invention, hydrogen fueling is possible even though the pressure of the hydrogen tank is maintained at about atmospheric pressure. Also, in the hydrogen fueling method according to the present invention, hydrogen fueling is possible even though there are a temperature error of −5° C. and a pressure error of +1.5 MPa.

Also, in the hydrogen fueling method according to the present invention, application is possible without limiting the capacity of the hydrogen tank, the pressure range is easy to change, and the flow rate is not limited, whereby a wide variety of applications is possible.

Also, in the hydrogen fueling method according to the present invention, the prr is calculated to perform hydrogen fueling in consideration of the temperature, the pressure, etc. of the hydrogen tank based on real-time communication, whereby there is an advantage in that it is possible to more efficiently perform hydrogen fueling, and therefore precise control is possible.

The dispenser controller 310 that performs the hydrogen fueling process based on the real-time responding hydrogen fueling protocol according to the embodiment of the present invention described above may be implemented in the form of an application executed by a computer or a recording medium including commands executable by a computer, such as a program module. A computer-readable medium may be an arbitrary medium that can be accessed by the computer, and all of volatile and nonvolatile media and separable and nonseparable media are included. In addition, the computer-readable medium may include all computer storage media. The computer storage media include all volatile and nonvolatile and separable and nonseparable media implemented by an arbitrary method or technology for storing information, such as a computer-readable command, a data structure, a program module, or other data.

The above description of the present invention described above is merely illustrative, and those skilled in the art to which the present invention pertains will understand that the present invention can be easily implemented in other concrete forms without changing the technical concept or essential features of the present invention. Therefore, the embodiments described above should be construed in all aspects as illustrative and not restrictive. For example, single type components may be implemented in a dispersed state, and dispersed components may be implemented in an integrated state.

The scope of the present invention is defined by the appended claims, not the above detailed description, and it should be interpreted that all alterations or modifications derived from the meaning and scope of the claims and equivalent concepts thereto are included in the scope of the present invention.

INDUSTRIAL APPLICABILITY

A method of executing a real-time responding hydrogen fueling process according to the present invention and an apparatus therefor are applicable to the hydrogen fueling industry.

The invention claimed is:

1. A method of executing a real-time responding (RTR) hydrogen fueling process by a hydrogen dispenser, the method comprising:

calculating a pressure loss coefficient value in a fueling line of a RTR hydrogen fueling protocol to be applied to a real case;

calculating an inner diameter value of the fueling line of the RTR hydrogen fueling protocol for simulation to apply in the real case based on the calculated pressure loss coefficient value, a reference pressure loss coefficient value for a reference case, and a reference inner diameter value for the reference case; and executing the RTR hydrogen fueling process by applying the calculated inner diameter value to a predetermined thermodynamic model for the RTR hydrogen fueling protocol, wherein the reference pressure loss coefficient value and the reference inner diameter value are predetermined based on conditions that a temperature of a hydrogen tank is 85° C. and a state of charge (SOC) of the hydrogen tank is 95% at a point in time when hydrogen fueling is finished in a fueling line of the reference case.

2. The method according to claim 1, comprising:

obtaining first information including information related to a real-time temperature of a hydrogen tank in a compressed hydrogen storage system, a real-time pressure of the hydrogen tank, and a real-time state of charge of the hydrogen tank; and determining whether at least one of the obtained real-time temperature of the hydrogen tank, the obtained real-time pressure of the hydrogen tank, and the obtained real-time state of charge of the hydrogen tank is equal to or greater than a predetermined value.

3. The method according to claim 2, further comprising: checking whether the at least one of the obtained real-time temperature of the hydrogen tank, the obtained real-time pressure of the hydrogen tank, and the obtained state of charge of the hydrogen tank is not equal to or greater than the predetermined value and a predetermined time has elapsed after starting of hydrogen fueling; and determining whether the obtained real-time pressure of the hydrogen tank is less than a predetermined pressure if the predetermined time has elapsed.

4. The method according to claim 2, further comprising: finishing the RTR hydrogen fueling process when the at least one is equal to or greater than the predetermined value.

5. The method according to claim 2, wherein at least one of the obtained real-time temperature of the hydrogen tank, the obtained real-time pressure of the hydrogen tank, and the obtained real-time state of charge of the hydrogen tank is updated in a predetermined cycle.

6. The method according to claim 2, further comprising: obtaining second information related to a hydrogen supply pressure and a hydrogen supply temperature of hydrogen to be supplied to the hydrogen tank; and controlling hydrogen fueling by applying the first information and the second information to the predetermined thermodynamic model.

7. The method according to claim 1, wherein the inner diameter value ($d_{FL}$) of the fueling line of the RTR hydrogen fueling protocol to be applied in the real case is calculated based on Mathematical Expression 1 below, $$d_{FL} = d_{FL,ref} \times \left(\frac{K_{FL,ref}}{K_{FL}}\right)^{0.25} \quad \text{[Mathematical Expression 1]}$$

where $d_{FL,ref}$ is the reference inner diameter value for the reference case, $K_{FL}$ is the calculated pressure loss coefficient value in the real case, and $K_{FL,ref}$ is the reference pressure loss coefficient value for the reference case.

8. A hydrogen dispenser for executing a real-time responding (RTR) hydrogen fueling process, the hydrogen dispenser comprising:

a memory; and a dispenser controller configured to calculate a pressure loss coefficient value in a fueling line of a RTR hydrogen fueling protocol to be applied to a real case, wherein the dispenser controller is configured to:

calculate an inner diameter value of the fueling line of the RTR hydrogen fueling protocol for simulation to apply in the real case based on the calculated pressure loss coefficient value, a reference pressure loss coefficient value for a reference case, and a reference inner diameter value for the reference case, the reference pressure loss coefficient value and the reference inner diameter value being stored in the memory; and execute the RTR hydrogen fueling process by applying the calculated inner diameter value to a predetermined thermodynamic model for the RTR hydrogen fueling protocol, wherein the reference pressure loss coefficient value and the reference inner diameter value are predetermined based on conditions that a temperature of a hydrogen tank is 85° C. and a state of charge (SOC) of the hydrogen tank is 95% at a point in time when hydrogen fueling is finished in a fueling line of the reference case.

9. The hydrogen dispenser according to claim 8, wherein the dispenser controller is configured to:

obtain first information comprising information related to a real-time temperature of a hydrogen tank in a compressed hydrogen storage system, a real-time pressure of the hydrogen tank, and a real-time state of charge of the hydrogen tank; and determine whether at least one of the obtained real-time temperature of the hydrogen tank, the obtained real-time pressure of the hydrogen tank, and the obtained real-time state of charge of the hydrogen tank is equal to or greater than a predetermined value.

* * * * *